US012747716B2

(12) United States Patent
Schneider et al.

(10) Patent No.: US 12,747,716 B2
(45) Date of Patent: Sep. 29, 2026

(54) HYDRAULIC TURBINE

(71) Applicant: Natel Energy Holdings, Inc., Alameda, CA (US)

(72) Inventors: Abraham D. Schneider, San Francisco, CA (US); Sterling Marina Watson, San Francisco, CA (US)

(73) Assignee: Natel Energy Holdings, Inc., Alameda, CA (US)

(*) Notice: Subject to any disclaimer, the term of this patent is extended or adjusted under 35 U.S.C. 154(b) by 0 days.

(21) Appl. No.: 19/203,589

(22) Filed: May 9, 2025

(65) Prior Publication Data

US 2025/0334094 A1 Oct. 30, 2025

Related U.S. Application Data

(63) Continuation of application No. 18/629,530, filed on Apr. 8, 2024, now Pat. No. 12,320,325, which is a continuation of application No. 18/115,251, filed on Feb. 28, 2023, now Pat. No. 11,952,976, which is a continuation of application No. 16/968,112, filed as application No. PCT/US2020/022817 on Mar. 13, 2020, now Pat. No. 11,614,065.

(60) Provisional application No. 62/818,031, filed on Mar. 13, 2019.

(51) Int. Cl.

| | |
|---|---|
| ***F03B 3/12*** | (2006.01) |
| ***F03B 3/04*** | (2006.01) |
| ***F03B 13/10*** | (2006.01) |

(52) U.S. Cl.

CPC .............. *F03B 3/121* (2013.01); *F03B 3/125* (2013.01); *F03B 3/04* (2013.01); *F03B 3/126* (2013.01); *F03B 13/10* (2013.01); *F05B 2210/11* (2013.01); *F05B 2220/32* (2013.01); *F05B 2240/12* (2013.01); *F05B 2240/242* (2013.01); *F05B 2240/303* (2020.08); *F05B 2250/70* (2013.01); *F05B 2260/84* (2013.01)

(58) Field of Classification Search

CPC .......... F03B 3/121; F03B 3/125; F03B 3/126; F05B 2240/303; F05B 2260/84; F05B 2240/30; F05B 2240/301; F05B 2250/00

See application file for complete search history.

(56) References Cited

U.S. PATENT DOCUMENTS

| | | | | |
|---|---|---|---|---|
| 2,667,936 A * | 2/1954 | Clark | B63H 1/18 | 416/223 R |
| 2,709,052 A * | 5/1955 | Berg | B64C 3/14 | 416/223 R |
| 3,694,104 A * | 9/1972 | Erwin | F01D 5/3053 | 416/241 R |

(Continued)

FOREIGN PATENT DOCUMENTS

WO WO-2015157101 A1 * 10/2015 ............... B63H 1/18

*Primary Examiner* — Pedro J Cuevas

(74) *Attorney, Agent, or Firm* — Sterne, Kessler, Goldstein & Fox P.L.L.C.

(57) ABSTRACT

A runner for a hydraulic turbine configured to reduce fish mortality. The runner includes a hub and a plurality of blades extending from the hub. Each blade includes a root connected to the hub and a tip opposite the root. Each blade further includes a leading edge opposite a trailing edge, and a ratio of a thickness of the leading edge to a diameter of the runner can range from about 0.06 to about 0.35. Further, each blade has a leading edge that is curved relative to a radial axis of the runner.

19 Claims, 25 Drawing Sheets

(56) References Cited

U.S. PATENT DOCUMENTS

| | | | | |
|---|---|---|---|---|
| 8,770,941 | B2 * | 7/2014 | Smith | F03D 1/0608 416/223 R |
| 8,777,573 | B2 * | 7/2014 | Hibbard | F03D 13/10 416/132 B |
| 9,587,645 | B2 * | 3/2017 | Guglielmin | C23C 30/00 |
| 10,364,823 | B2 * | 7/2019 | Guglielmin | C23C 30/00 |
| 10,473,112 | B2 * | 11/2019 | Smith | F01D 5/26 |
| 10,926,837 | B2 * | 2/2021 | Pritchard | B63B 1/248 |
| 11,254,404 | B2 * | 2/2022 | Russell | B64C 11/18 |
| 11,280,199 | B2 * | 3/2022 | McNamee | F01D 5/141 |
| 11,608,743 | B1 * | 3/2023 | Tweedt | B64C 11/18 |
| 11,679,852 | B1 * | 6/2023 | Pritchard | B63H 1/18 244/35 R |
| 11,746,741 | B2 * | 9/2023 | Lipka | F03D 1/0633 416/223 R |
| 12,049,306 | B2 * | 7/2024 | Ramakrishnan | B64C 27/467 |
| 2012/0082556 | A1 * | 4/2012 | Macchia | F01D 9/041 427/256 |
| 2012/0082559 | A1 * | 4/2012 | Guglielmin | F01D 25/162 29/889.7 |
| 2016/0258443 | A1 * | 9/2016 | Guglielmin | C23C 30/00 |
| 2018/0231018 | A1 * | 8/2018 | Smith | F04D 29/384 |
| 2023/0249810 | A1 * | 8/2023 | Ramakrishnan | B64C 27/463 416/223 R |
| 2026/0002507 | A1 * | 1/2026 | Schneider | F03B 3/123 |
| 2026/0084826 | A1 * | 3/2026 | Carle | B64C 3/32 |

* cited by examiner

FIG. 19B
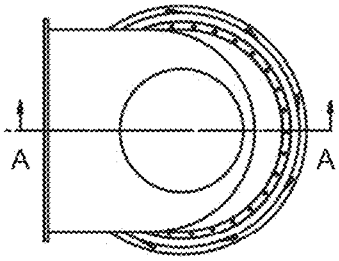
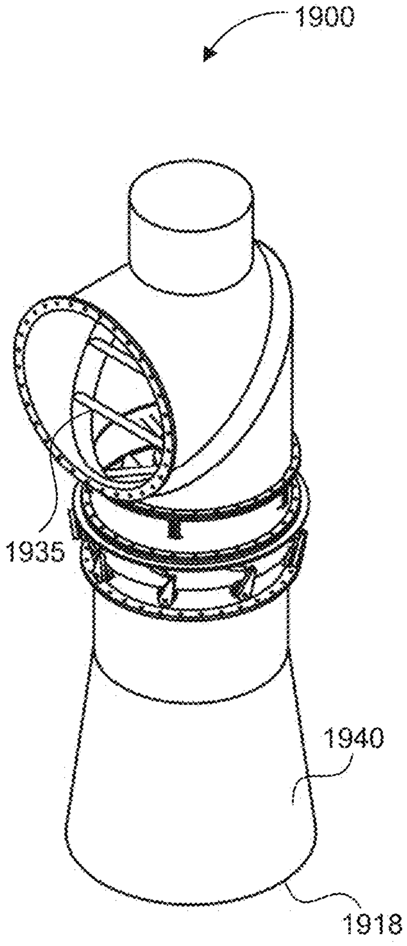
FIG. 19A
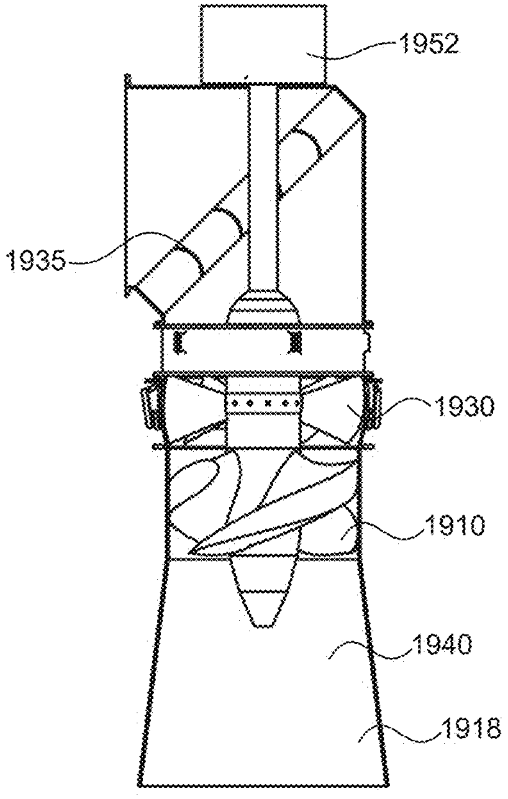
FIG. 19C

HYDRAULIC TURBINE

CROSS-REFERENCE TO RELATED APPLICATIONS

This application is a continuation of U.S. application Ser. No. 18/629,530, filed Apr. 8, 2024, which is a continuation of U.S. application Ser. No. 18/115,251, now U.S. Pat. No. 11,952,976, filed Feb. 28, 2023, which is a continuation of U.S. application Ser. No. 16/968,112, now U.S. Pat. No. 11,614,065, having a § 371(c) date of Aug. 6, 2020, which is a national stage application of PCT/US2020/022817, filed Mar. 13, 2020, which claims the benefit of U.S. Provisional Patent Application No. 62/818,031, filed Feb. Mar. 13, 2019. The disclosures of each of which applications are incorporated herein by reference in their entireties.

FIELD OF THE INVENTION

The present invention relates to a hydroelectric turbine runner. Specifically, the present invention relates to a turbine runner for low-head applications configured to promote safe downstream passage of fish through the turbine.

BACKGROUND OF THE INVENTION

There is an increasing need for hydropower plants that have a low impact on the environment. In order to reduce environmental impact, hydropower plants are being designed for low-head applications (e.g., head of 20 meters or less) and very-low-head applications (e.g., head of 5 meters or less) such as for installation in a river or stream. It is desirable for hydropower plants to have a minimal effect on fish and other aquatic wildlife (e.g., by not harming fish and by avoiding blocking the travel or migration of fish). It is also desirable to construct hydropower plants with relatively low installation, operation, and maintenance costs.

Accordingly, there is a continuing need in the art for a turbine for low-head applications that allows for safe downstream passage of fish through the turbine and that minimizes costs of installation, operation, and maintenance.

BRIEF SUMMARY OF THE INVENTION

Some embodiments herein relate to a runner for a hydraulic turbine that includes a hub and a plurality of blades extending from the hub. Each blade has a root connected to the hub and a tip opposite the root, and further includes a leading edge opposite a trailing edge. A ratio of a thickness of the leading edge of a blade to a diameter of the runner can be approximately 0.08 to approximately 0.2. The leading edge of each blade can be straight or can be curved relative to a radial axis perpendicular to the rotation axis of the runner.

In any of the various embodiments discussed herein, the thickness of the leading edge of the blade can be at least approximately 50 mm.

In any of the various embodiments discussed herein, the plurality of blades may include three blades.

In any of the various embodiments discussed herein, each of the plurality of blades may have the same shape and dimensions.

In any of the various embodiments discussed herein, the leading edge of each of the plurality of blades may have a saddle shape.

In any of the various embodiments discussed herein, a ratio of the thickness of a blade of the plurality of blades to a diameter of the runner may be from about 0.06 to about 0.35.

In any of the various embodiments discussed herein, the leading edge of a blade of the plurality of blades may form an angle at the tip relative to an adjacent concentric surface of about 20 to about 45 degrees.

In any of the various embodiments discussed herein, the root of the blade at the leading edge may be arranged at a radial axis of the runner and the tip of the blade at the leading edge is arranged coincident with the radial axis.

In any of the various embodiments discussed herein, the root of the blade at the leading edge may be arranged at a radial axis of the runner, and the tip of the blade at the leading edge may extend forward of the radial axis.

In any of the various embodiments discussed herein, the runner may have a diameter of at least about 0.5 meter.

Some embodiments herein relate to an axial-flow turbine, including a housing defining an inlet for a flow of liquid and an outlet, a wicket gate assembly for controlling a flow of liquid, a runner according to an embodiment as described herein, and a draft tube downstream of the runner.

In any of the various embodiments discussed herein, the wicket gate assembly of the turbine may include a plurality of fixed pitch wicket gates.

In any of the various embodiments discussed herein, a ratio of a length of the turbine runner as measured in a direction of a longitudinal axis of the turbine to a diameter of the turbine may be about 0.25 to about 0.75, and preferably between about 0.58 and 0.65 for a runner with 3 blades.

In any of the various embodiments discussed herein, the turbine may further include a bulb configured to house a generator.

Some embodiments herein relate to a hydroelectric installation for a low-head application, including a plurality of turbine chambers configured to maintain a head between a headwater upstream of the turbine chamber and a tailwater downstream of the turbine chamber, and a plurality of axial-flow turbines arranged in a vertical orientation within each of the plurality of turbine chambers. Each of the axial-flow turbines includes a housing defining a flow passage, a wicket gate assembly for controlling a flow of water into the housing, a runner comprising a hub and a plurality of blades configured to be rotatably driven by the flow of water, and a draft tube configured to direct the flow of water to the tailwater.

In any of the various embodiments discussed herein, each of the plurality of turbine chambers may include prefabricated concrete panels.

In any of the various embodiments discussed herein, each of the plurality of turbine chambers may be defined by a pair of spaced and parallel sidewalls, a floor, and a downstream wall configured to maintain a head of the hydroelectric installation. In some embodiments, each of the plurality of axial-flow turbines may be seated on the floor of a turbine chamber under the force of gravity.

In any of the various embodiments discussed herein, the hydroelectric installation may further include a trash rack positioned in a horizontal or near-horizontal orientation and configured to prevent debris from entering the axial-flow turbines.

In any of the various embodiments discussed herein, the hydroelectric installation may further include an upstream gate movable between an open position and a closed position for controlling a flow of water into the plurality of turbine chambers.

In any of the various embodiments discussed herein, the hydroelectric installation may further include a downstream gate movable between an open position and a closed position for controlling a head of the hydroelectric installation.

In any of the various embodiments discussed herein, the hydroelectric installation may further include a crane configured to remove or install an axial-flow turbine in the hydroelectric installation.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

Figure 8:
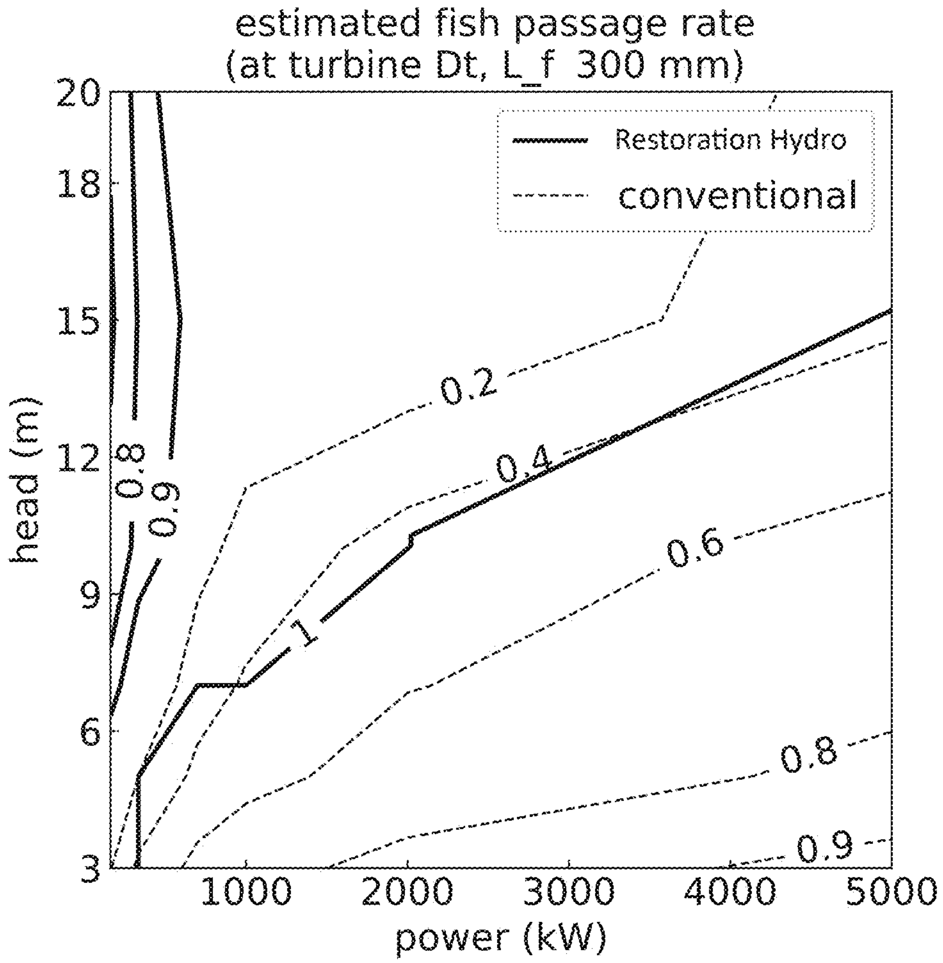

FIG. 8 is a contour plot of the estimated fish survival rate assuming 300 mm long fish struck near the tip of the turbine runners, for turbines across a range of power at a range of head, for conventional and the Restoration Hydro turbines, and assuming a ratio of leading edge thickness to runner diameter of 0.035 for conventional turbines and 0.012 for Restoration Hydro turbines, and assuming a slant angle at the runner tip of between 20 and 45 degrees for the Restoration Hydro turbines.

Figures 9A, 9D, 9E, 9F:
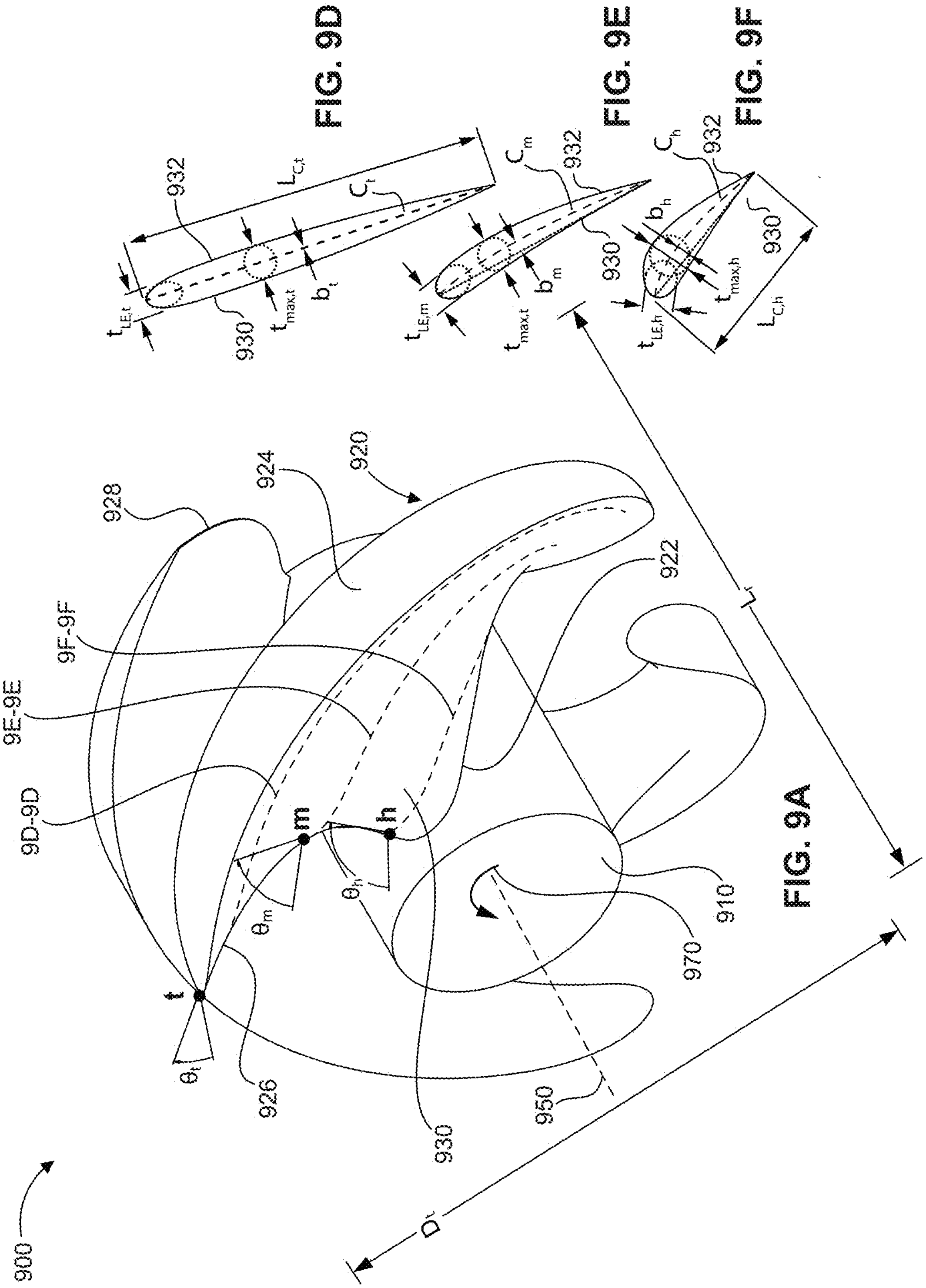

FIG. 9A is a perspective view of a runner for a hydraulic turbine according to an embodiment.

Figure 9C:
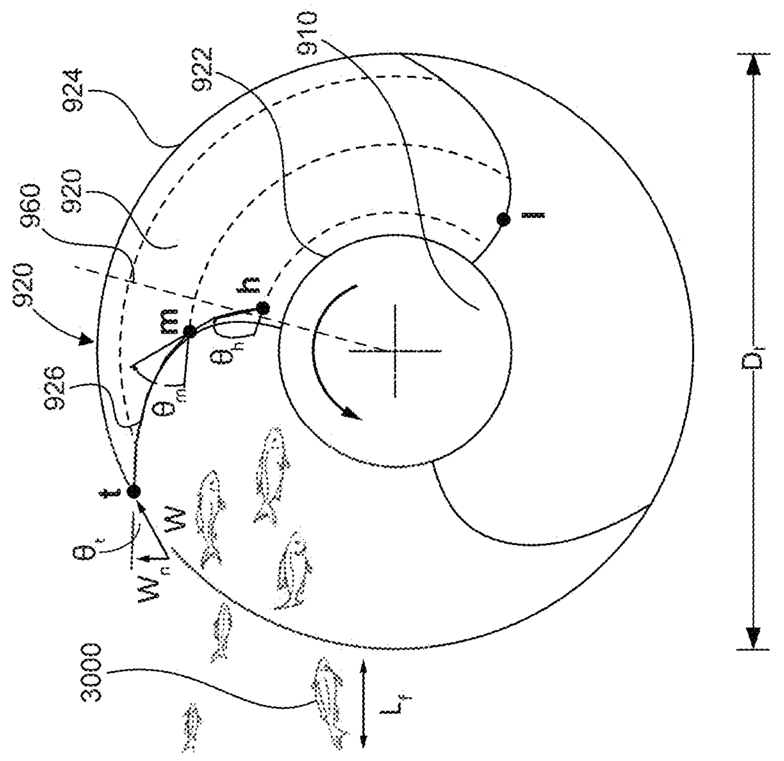
Figure 9B:
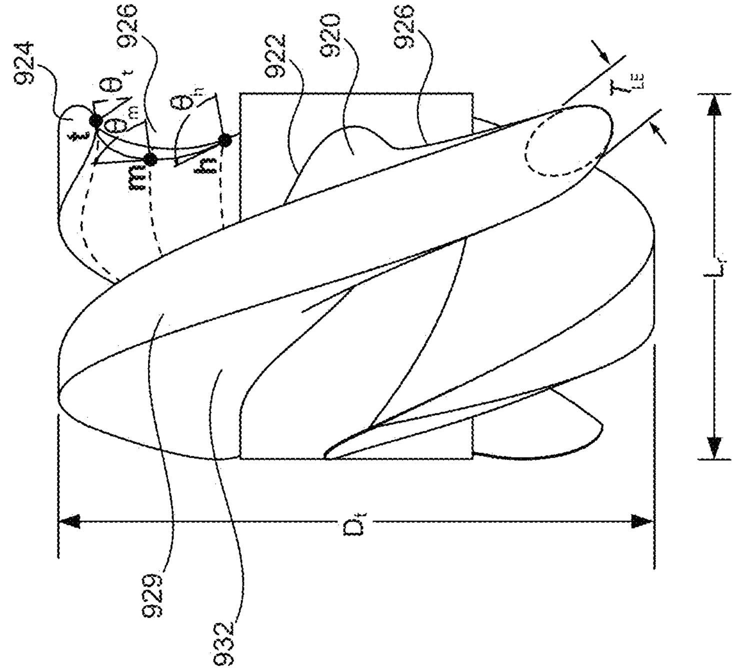

FIG. 9B is a side view of the runner according to FIG. 9A.

FIG. 9C is an upstream view of the runner according to FIG. 9A, showing fish encountering the runner blade.

FIG. 9D is a cross sectional view of a blade of the runner of FIG. 9A taken at line 9D-9D.

FIG. 9E is a cross sectional view of a blade of the runner of FIG. 9A taken at line 9E-9E.

FIG. 9F is a cross sectional view of a blade of the runner of FIG. 9A taken at line 9F-9F.

Figures 10A, 10D, 10E, 10F:
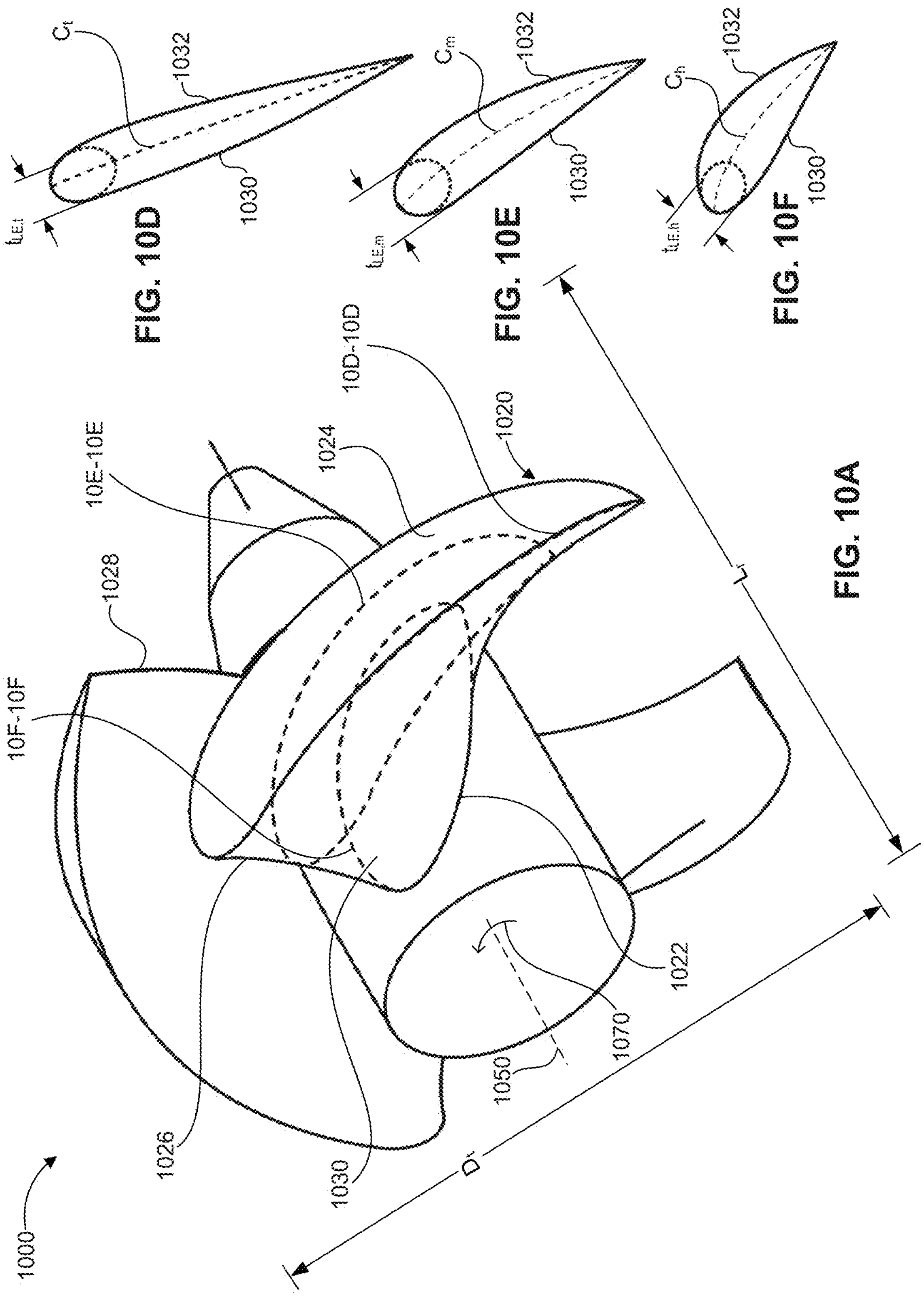

FIG. 10A is a perspective view of a runner for a hydraulic turbine according to an embodiment.

Figure 10C:
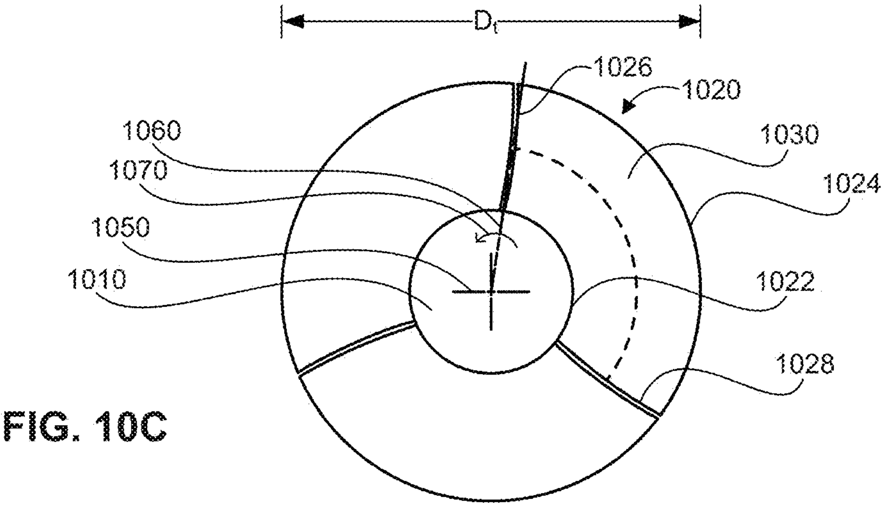
Figure 10B:
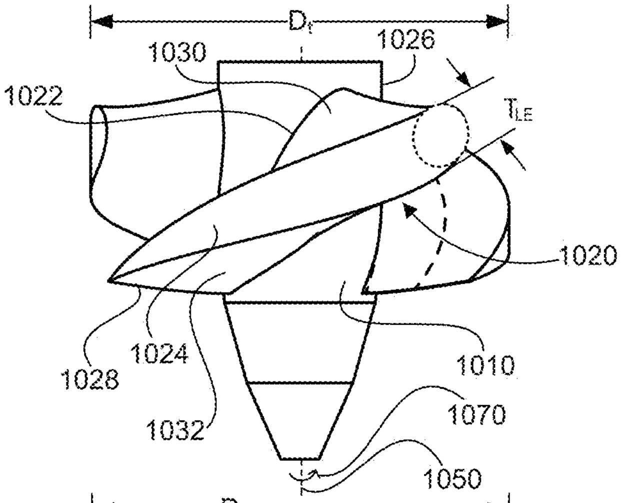

FIG. 10B is a side view of the runner according to FIG. 10A.

FIG. 10C is an upstream view of the runner according to FIG. 10A.

FIG. 10D is a cross sectional view of a blade of the runner of FIG. 10A taken at line 10D-10D.

FIG. 10E is a cross sectional view of a blade of the runner of FIG. 10A taken at line 10E-10E.

FIG. 10F is a cross sectional view of a blade of the runner of FIG. 10A taken at line 10F-10F.

Figure 10G:
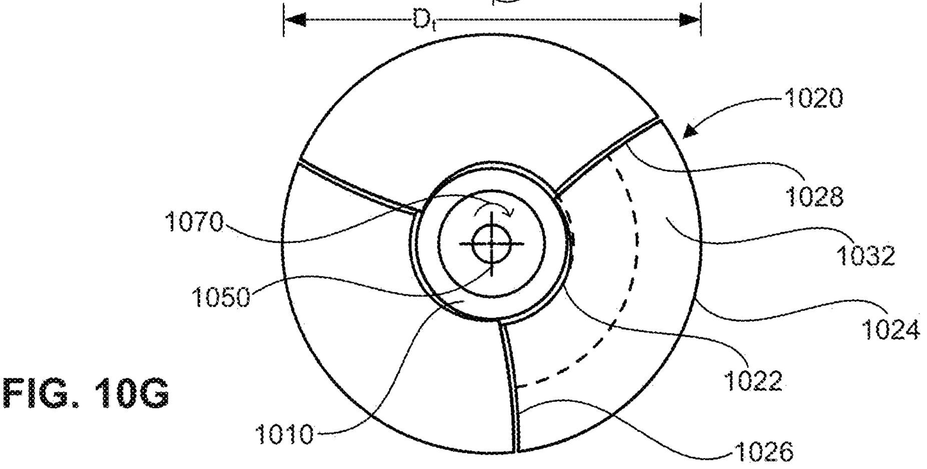

FIG. 10G is a downstream view of the runner according to FIG. 10A.

Figures 11A, 11D, 11E, 11F:
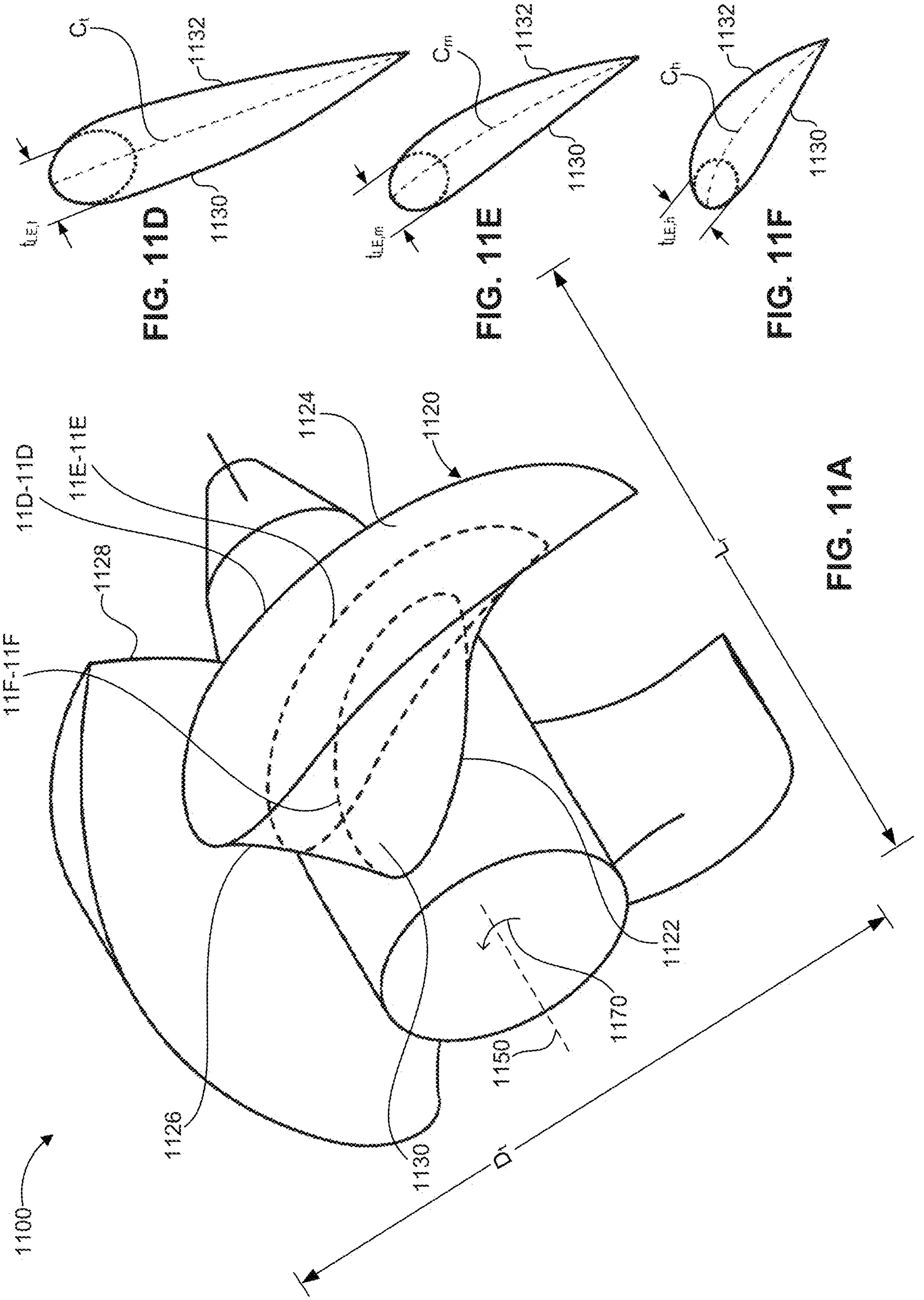

FIG. 11A is a perspective view of a runner for a hydraulic turbine according to an embodiment.

Figure 11C:
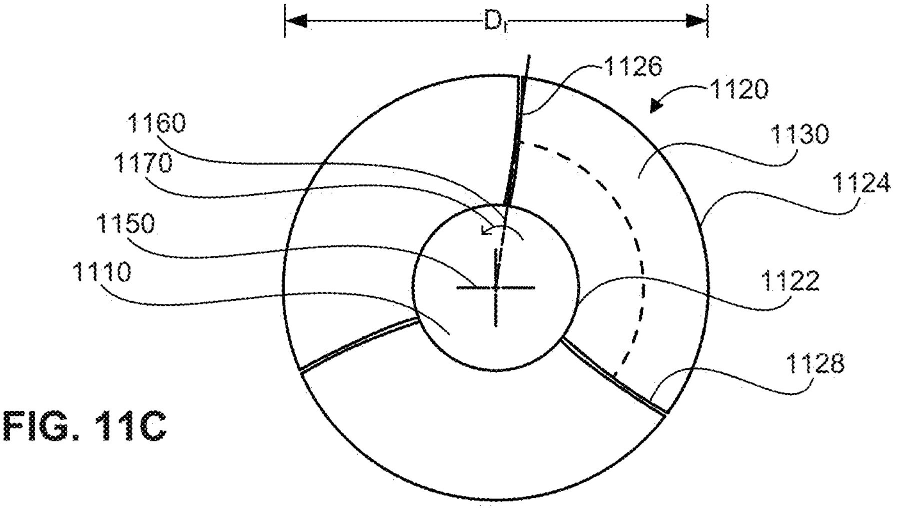
Figure 11B:
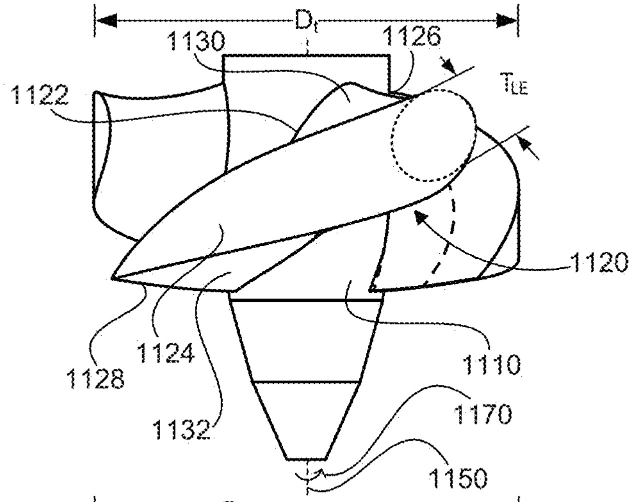

FIG. 11B is a side view of the runner according to FIG. 11A.

FIG. 11C is an upstream view of the runner according to FIG. 11A.

FIG. 11D is a cross sectional view of a blade of the runner of FIG. 11A taken at line 11D-11D.

FIG. 11E is a cross sectional view of a blade of the runner of FIG. 11A taken at line 11E-11E.

FIG. 11F is a cross sectional view of a blade of the runner of FIG. 11A taken at line 11F-11F.

Figure 11G:
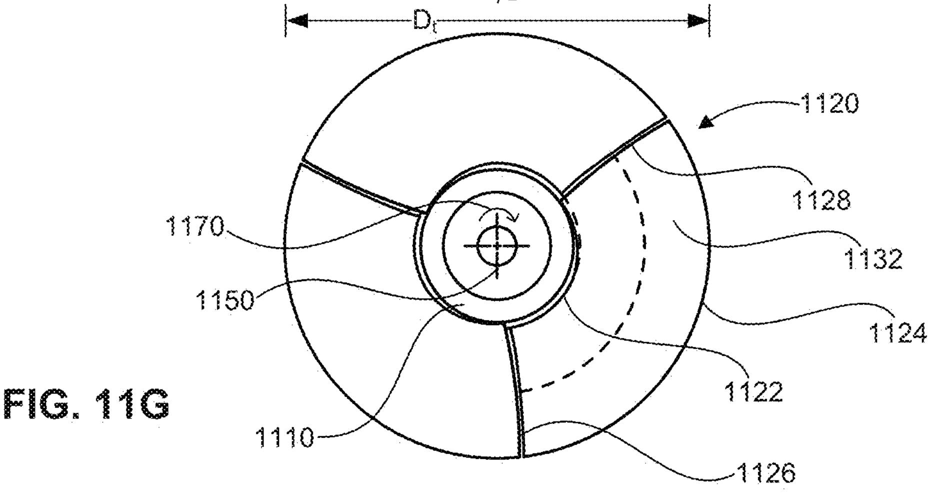

FIG. 11G is a downstream view of the runner according to FIG. 11A.

Figures 12A, 12D, 12E, 12F:
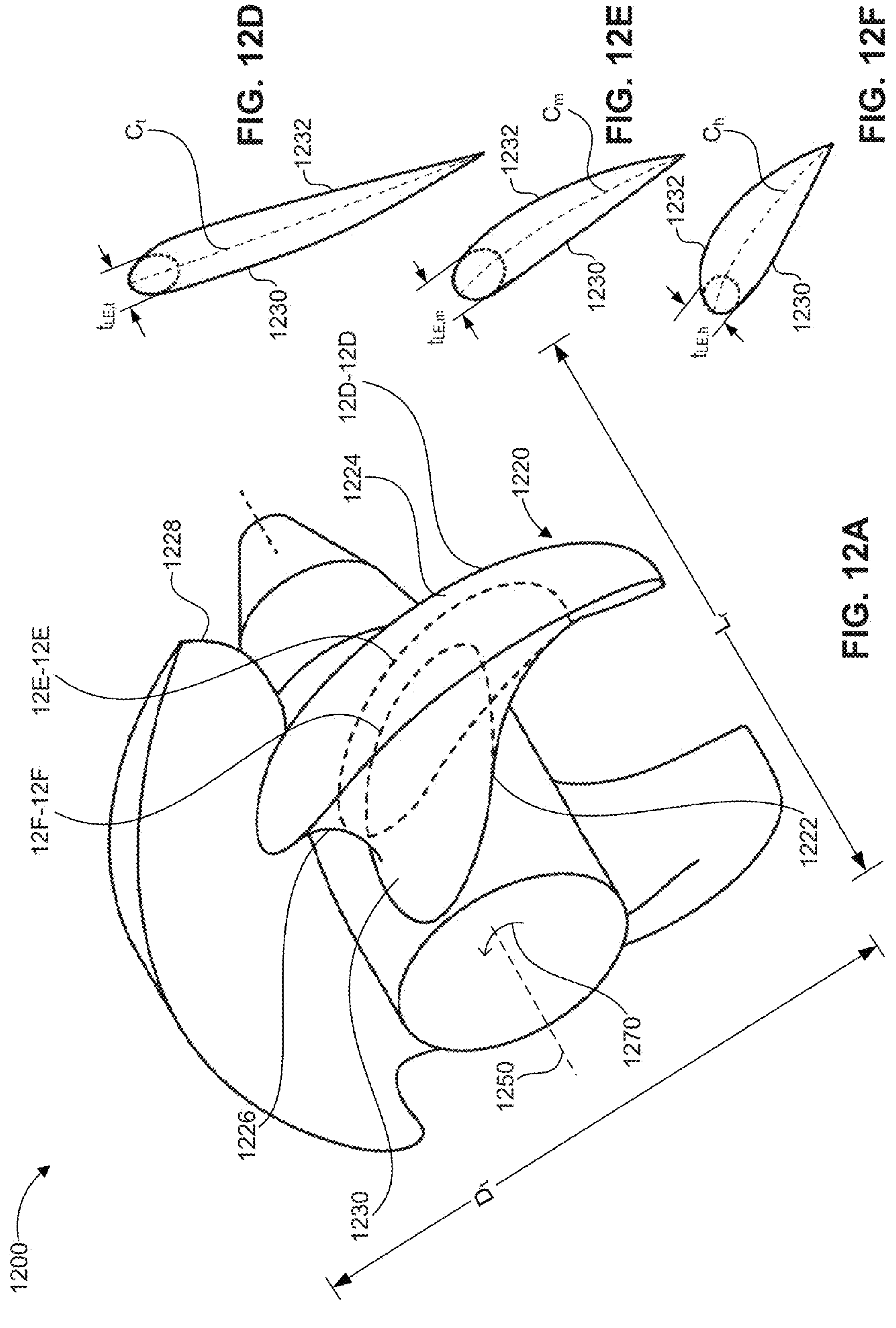

FIG. 12A is a perspective view of a runner for a hydraulic turbine according to an embodiment.

Figure 12C:
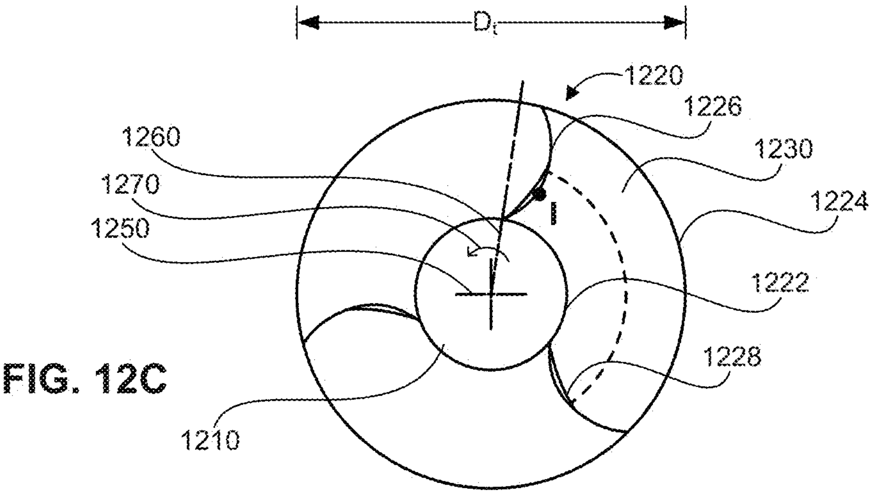
Figure 12B:
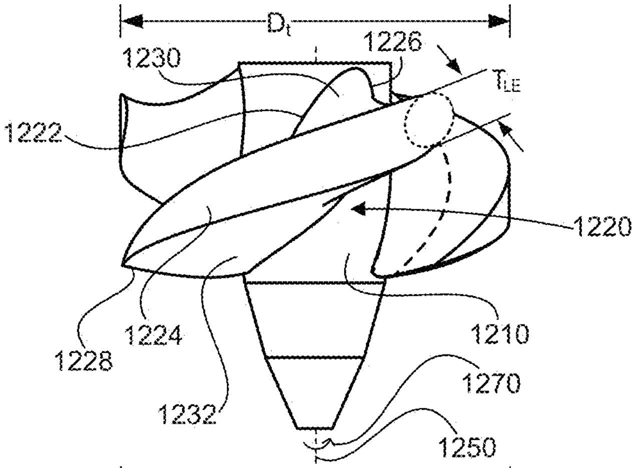

FIG. 12B is a side view of the runner according to FIG. 12A.

FIG. 12C is an upstream view of the runner according to FIG. 12A.

FIG. 12D is a cross sectional view of a blade of the runner of FIG. 12A taken at line 12D-12D.

FIG. 12E is a cross sectional view of a blade of the runner of FIG. 12A taken at line 12E-12E.

FIG. 12F is a cross sectional view of a blade of the runner of FIG. 12A taken at line 12F-12F.

Figure 12G:
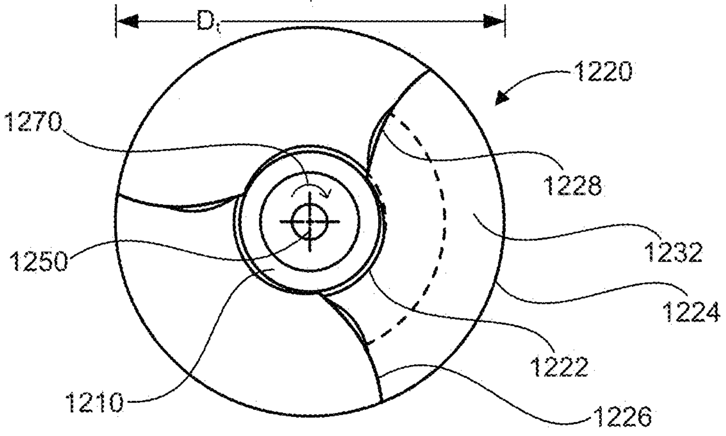

FIG. 12G is a downstream view of the runner according to FIG. 12A.

Figures 13A, 13D, 13E, 13F:
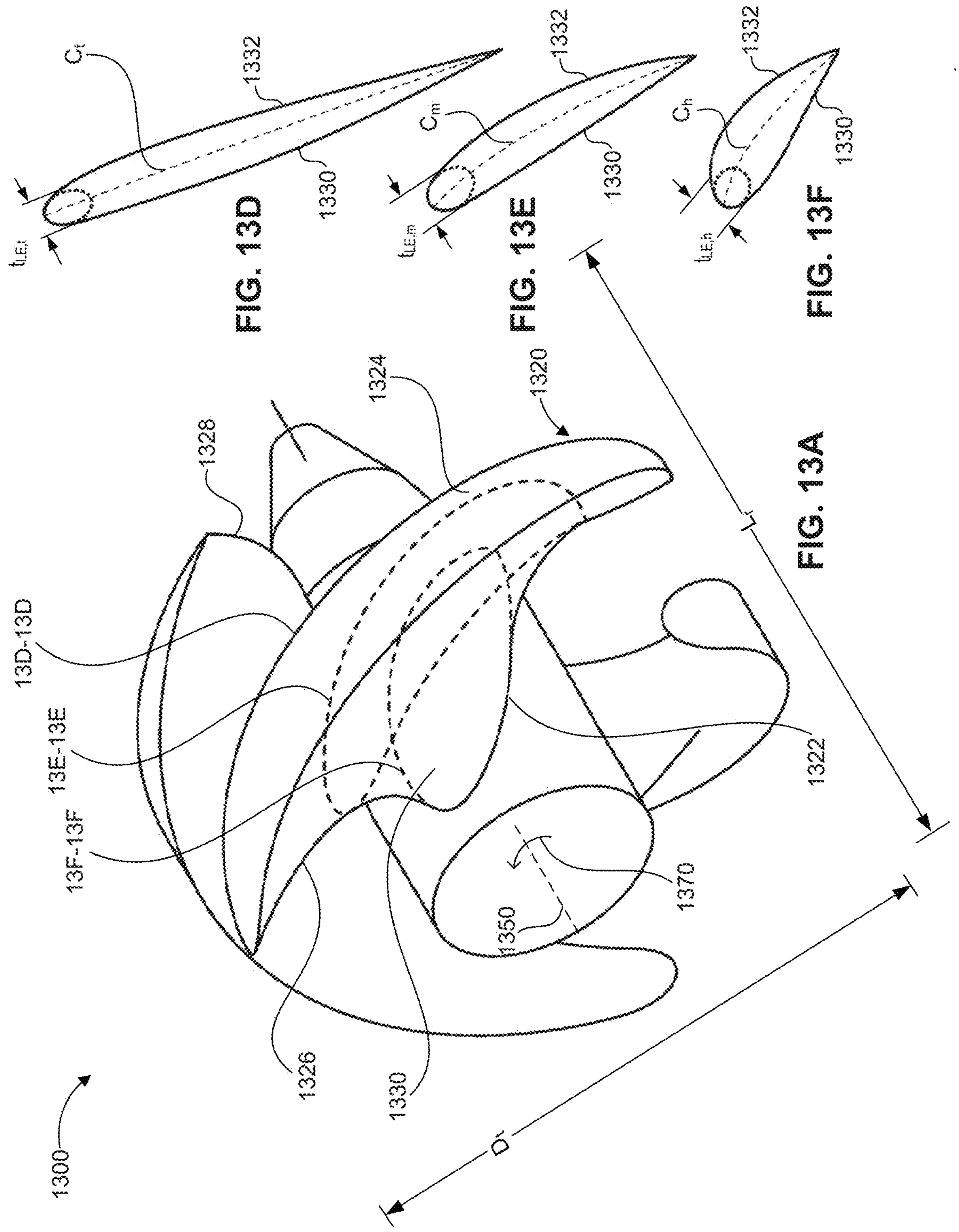

FIG. 13A is a perspective view of a runner for a hydraulic turbine according to an embodiment.

Figure 13C:
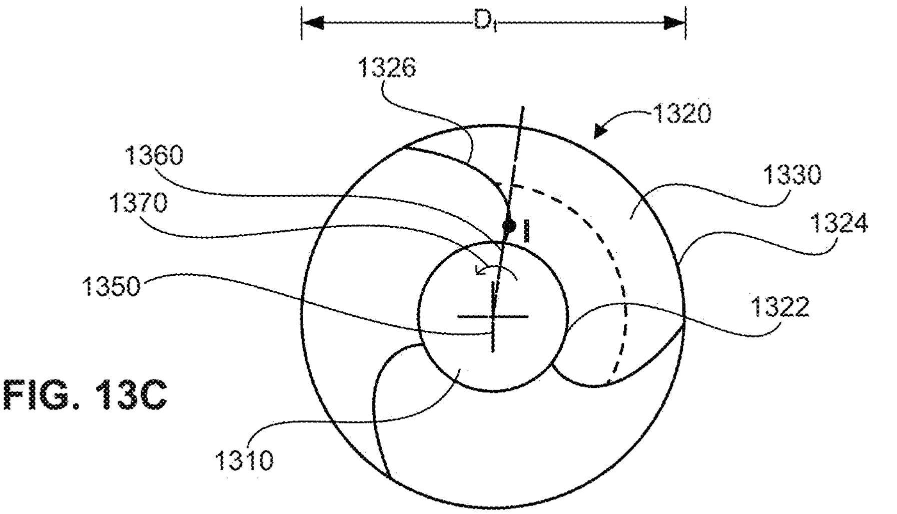
Figure 13B:
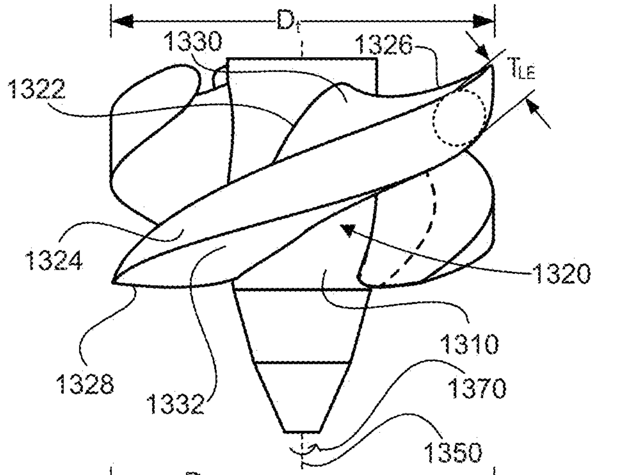

FIG. 13B is a side view of the runner according to FIG. 13A.

FIG. 13C is an upstream view of the runner according to FIG. 13A.

FIG. 13D is a cross sectional view of a blade of the runner of FIG. 13A taken at line 13D-13D.

FIG. 13E is a cross sectional view of a blade of the runner of FIG. 13A taken at line 13E-13E.

FIG. 13F is a cross sectional view of a blade of the runner of FIG. 13A taken at line 13F-13F.

Figure 13G:
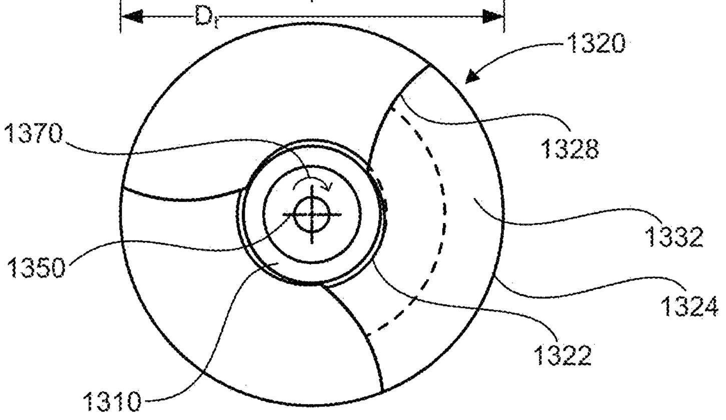

FIG. 13G is a downstream view of the runner according to FIG. 13A.

Figure 14D:
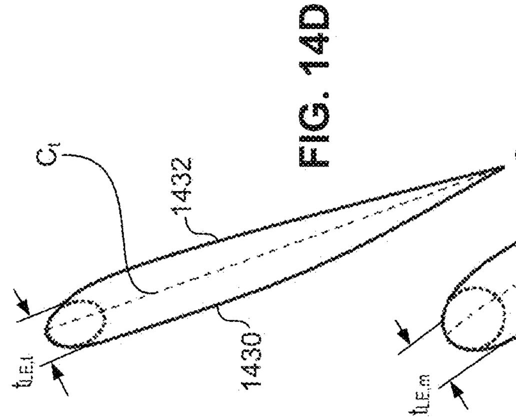
Figure 14E:
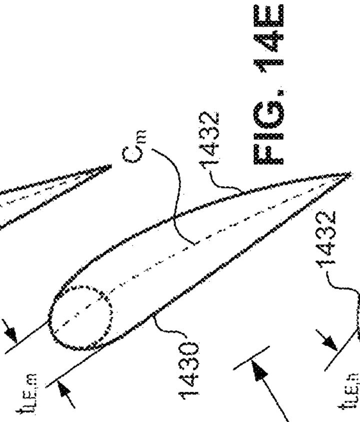
Figure 14F:
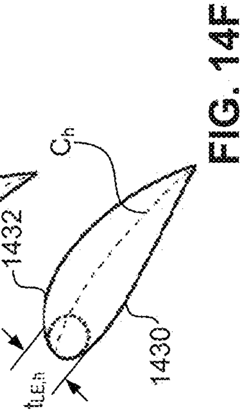
Figure 14A:
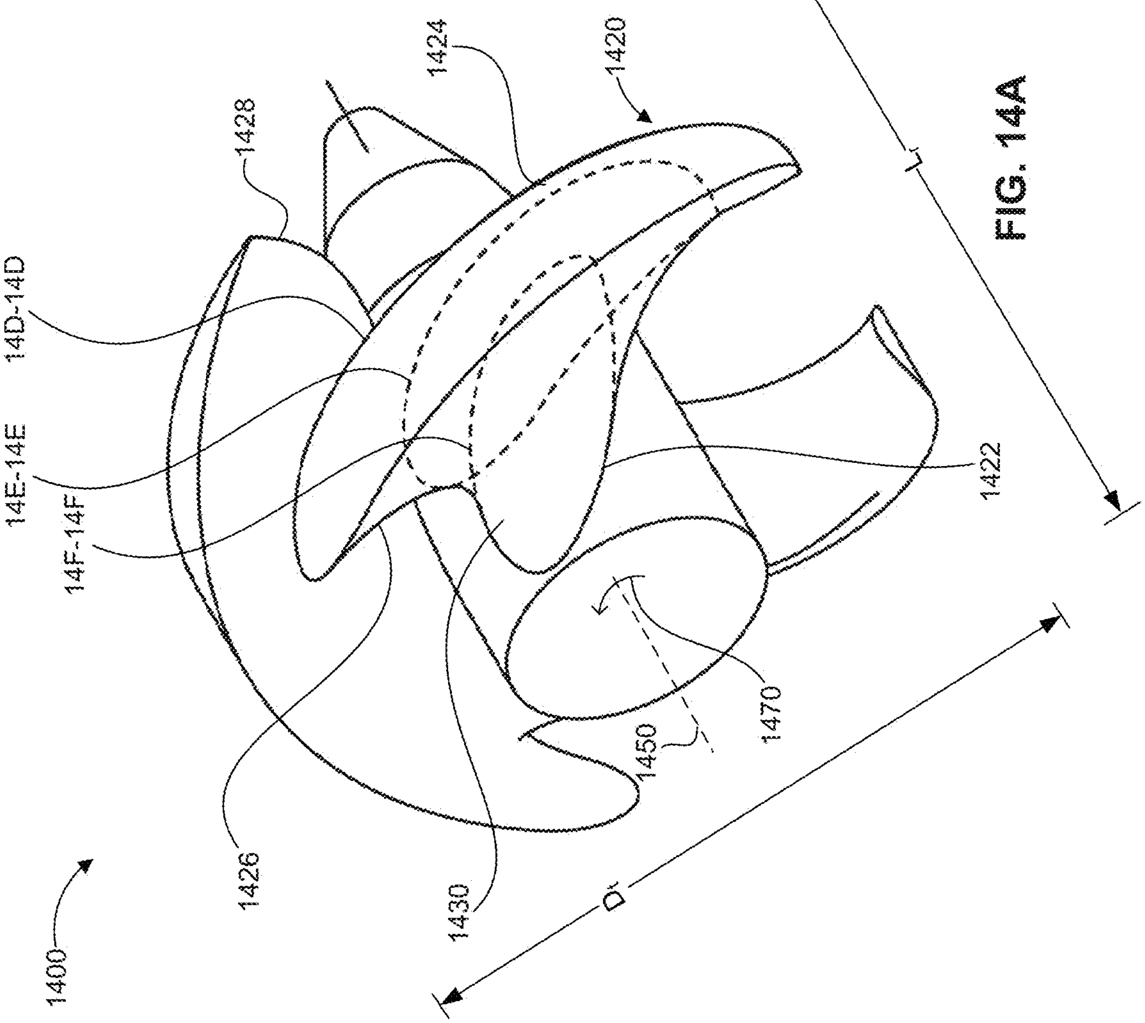

FIG. 14A is a perspective view of a runner for a hydraulic turbine according to an embodiment.

Figure 14C:
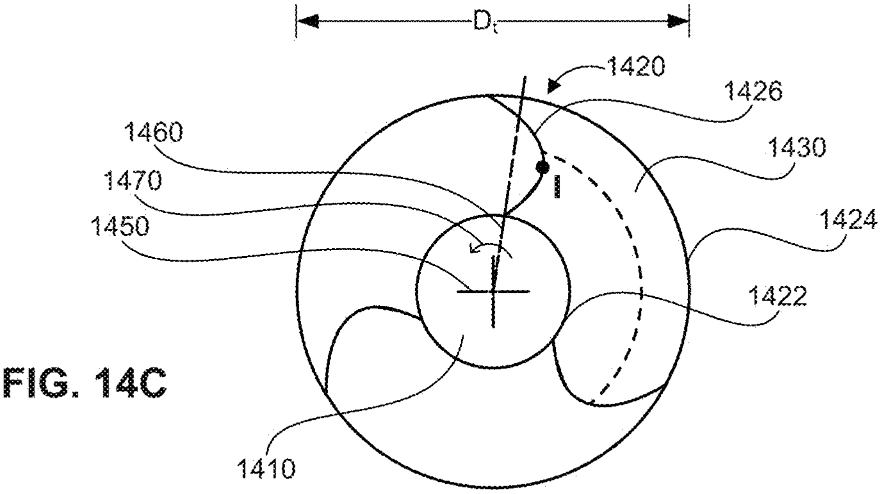
Figure 14B:
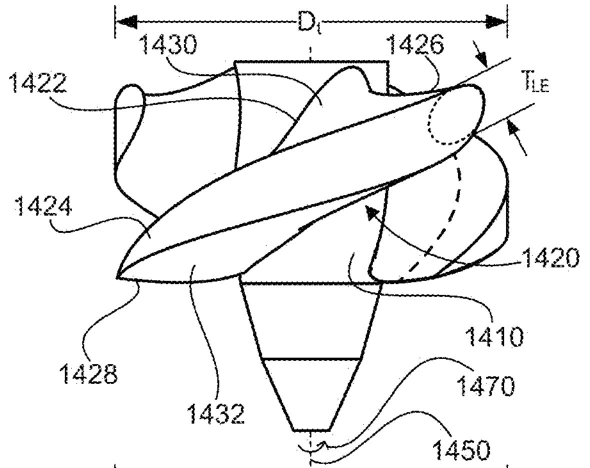

FIG. 14B is a side view of the runner according to FIG. 14A.

FIG. 14C is an upstream view of the runner according to FIG. 14A.

FIG. 14D is a cross sectional view of a blade of the runner of FIG. 14A taken at line 14D-14D.

FIG. 14E is a cross sectional view of a blade of the runner of FIG. 14A taken at line 14E-14E.

FIG. 14F is a cross sectional view of a blade of the runner of FIG. 14A taken at line 14F-14F.

Figure 14G:
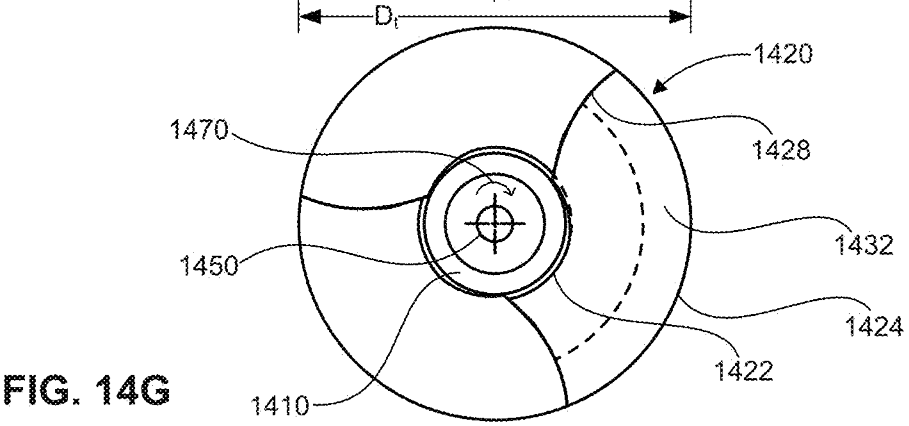

FIG. 14G is a downstream view of the runner according to FIG. 14A.

Figure 15B:
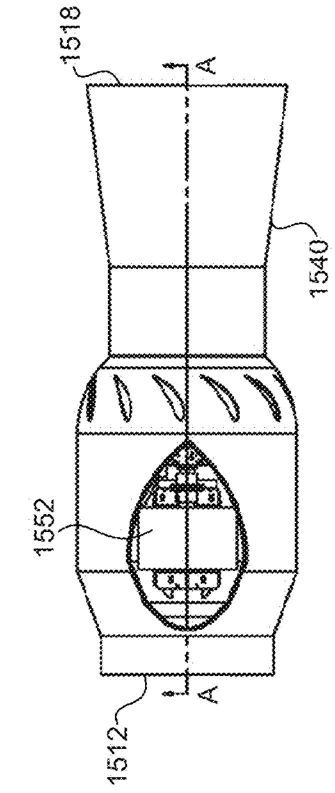
Figure 15C:
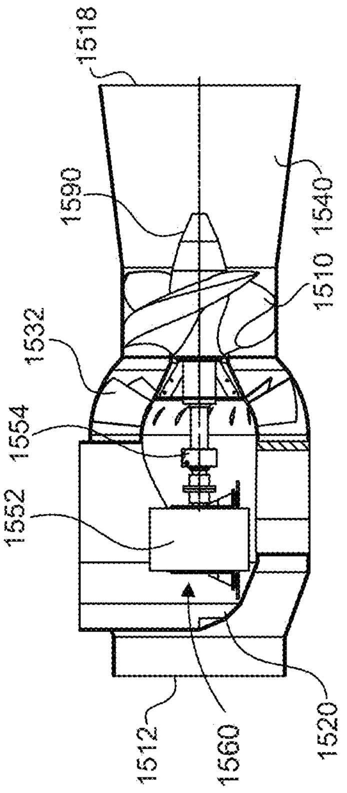
Figure 15A:
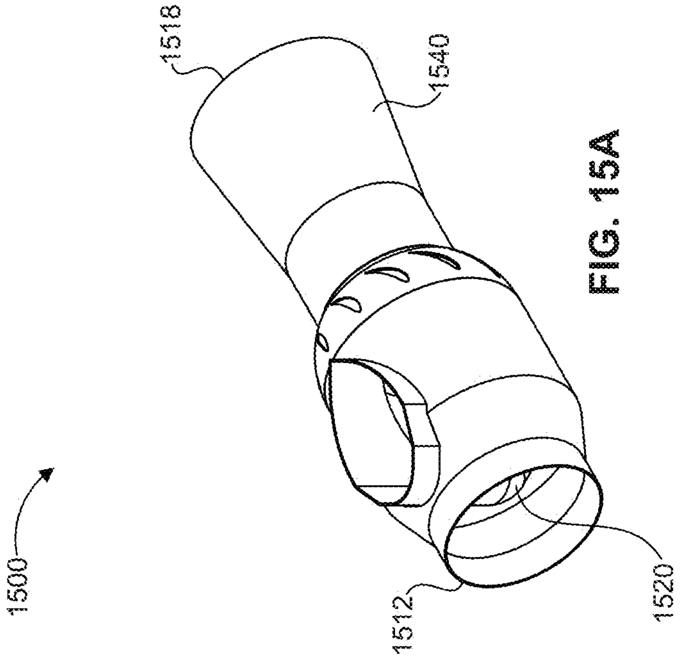

FIGS. 15A-C show a hydraulic turbine according to an embodiment.

Figure 16B:
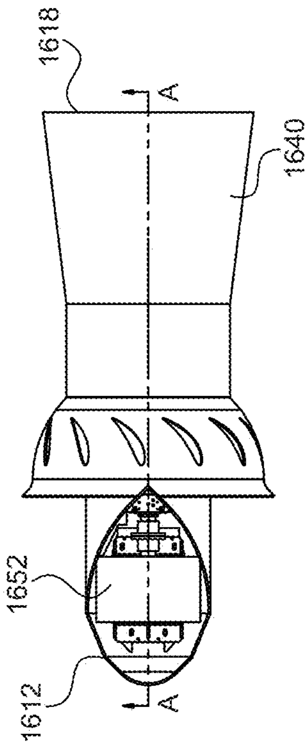
Figure 16C:
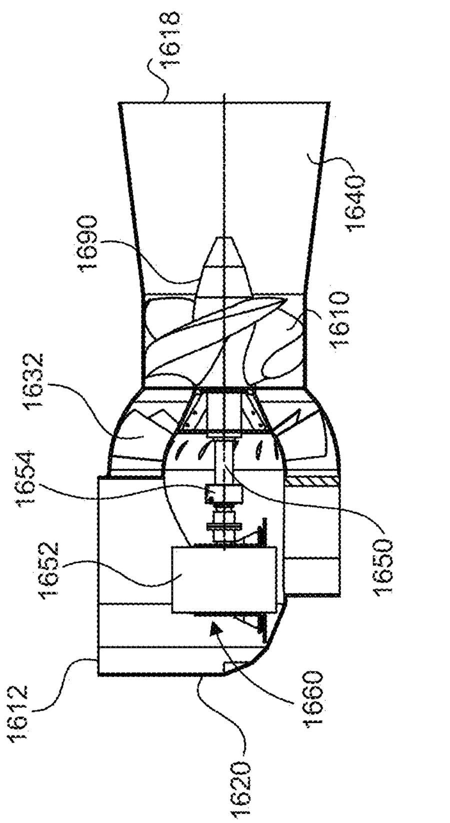
Figure 16A:
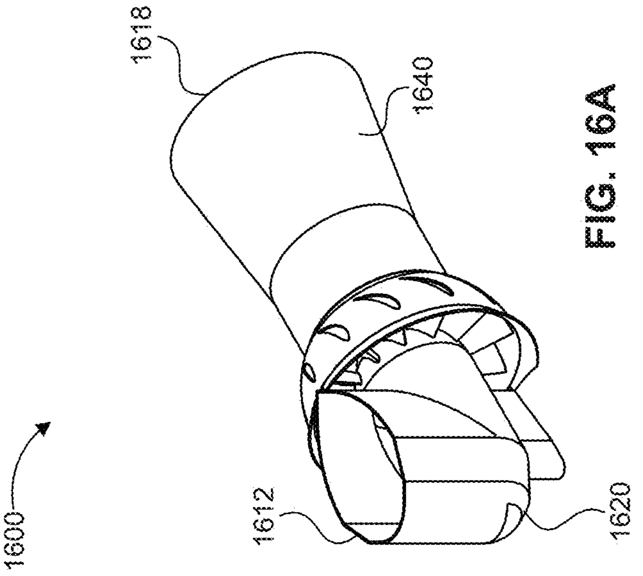

FIGS. 16A-C show a hydraulic turbine according to an embodiment.

Figure 17B:
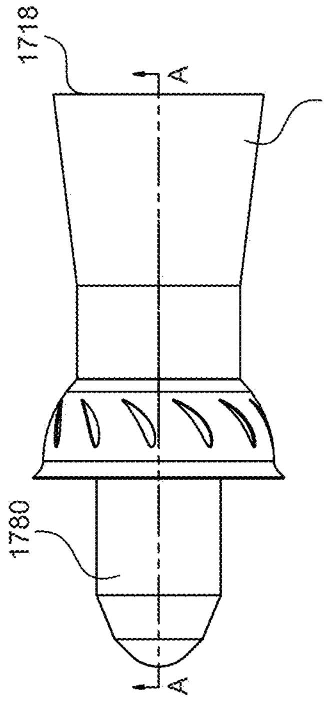
Figure 17C:
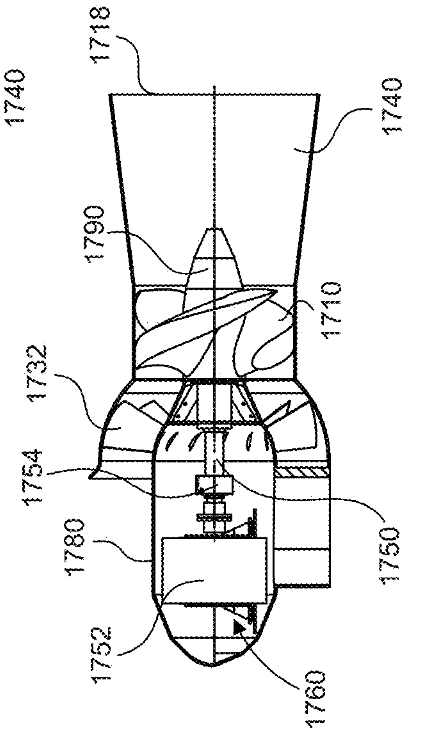
Figure 17A:
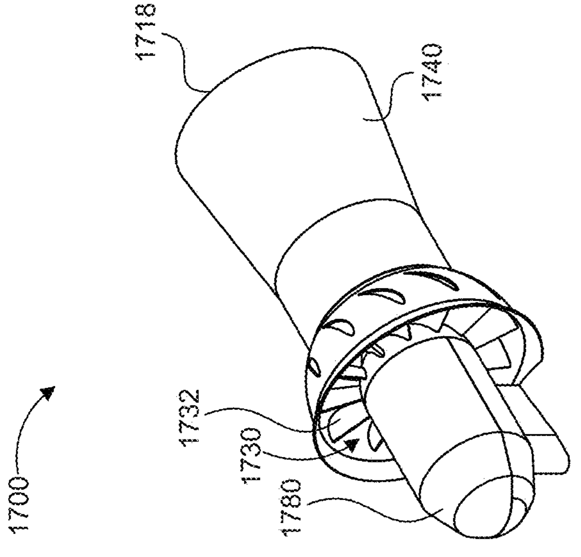

FIGS. 17A-C show a hydraulic turbine according to an embodiment.

Figure 18B:
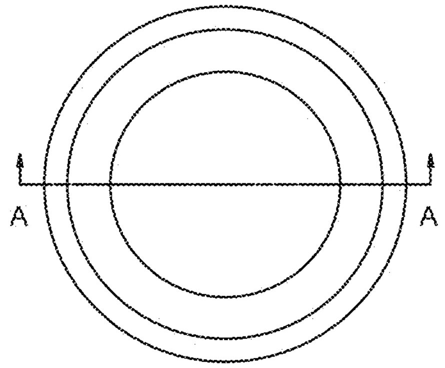
Figure 18A:
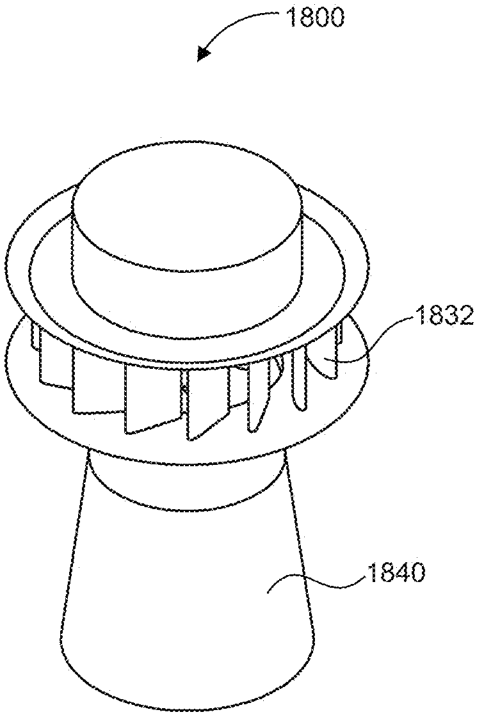
Figure 18C:
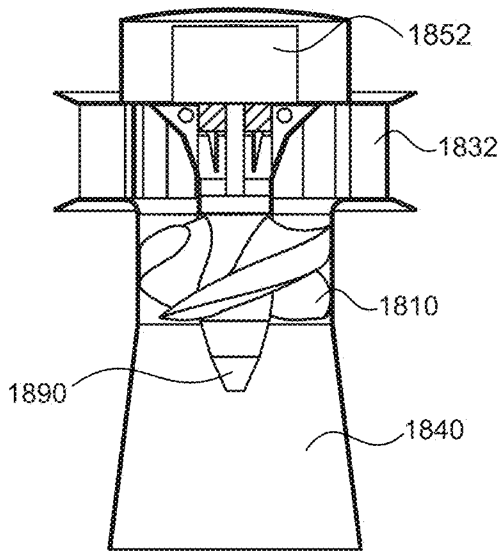

FIGS. 18A-C show a hydraulic turbine according to an embodiment.

FIGS. 19A-C show a hydraulic turbine according to an embodiment.

Figure 20A:
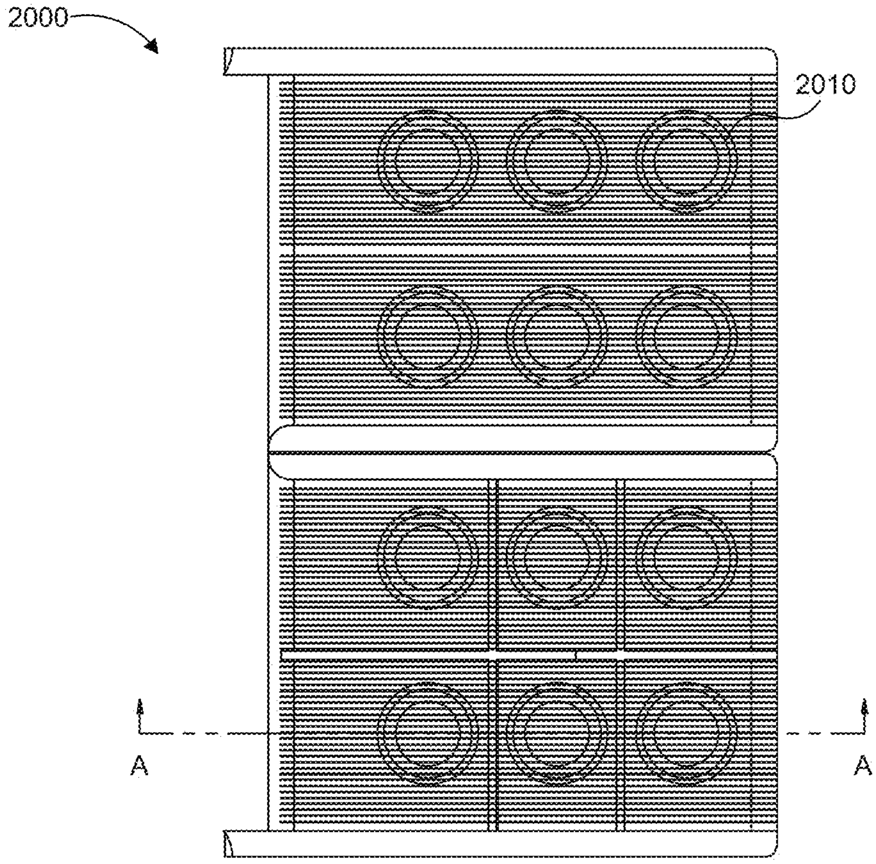

FIG. 20A is a diagram of a hydroelectric installation according to an embodiment.

Figure 20B:
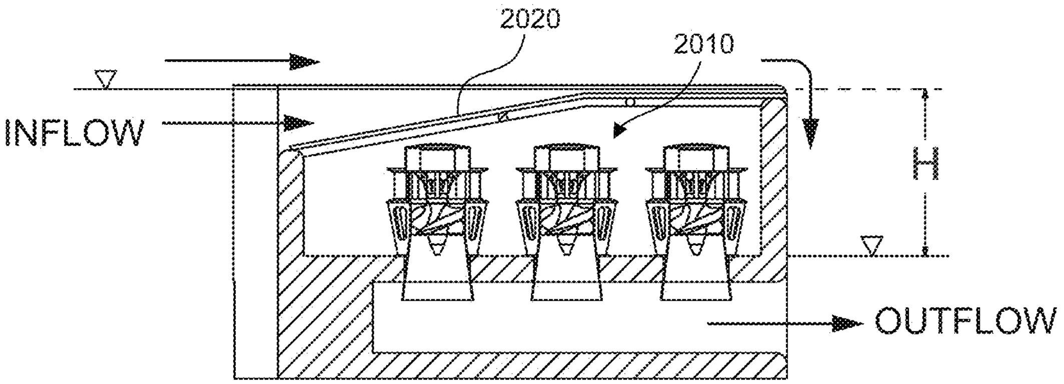

FIG. 20B is a sectional view of the hydroelectric installation of FIG. 20A, taken along line A-A.

Figure 21:
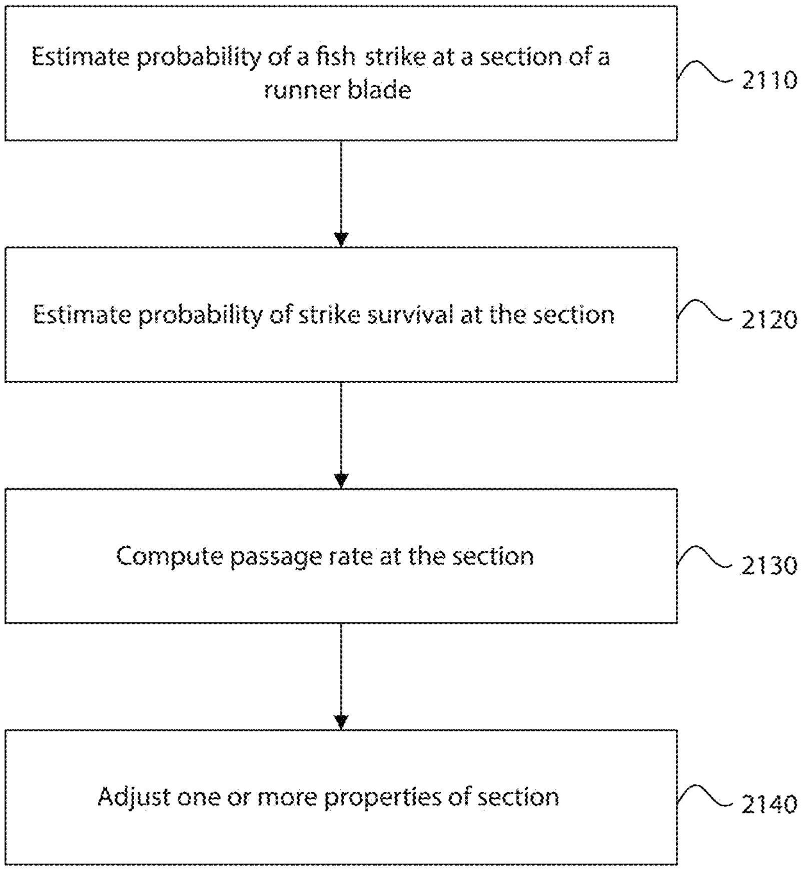

FIG. 21 is a flowchart regarding a method of designing a fish safe blade.

DETAILED DESCRIPTION OF THE INVENTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Modern hydropower facilities often can only be operated if the hydropower scheme can pass rigorous criteria for environmental sustainability. Despite avoiding some of environmental disturbances created by higher impoundments, low head hydropower plants, e.g., about 20 meters or less, or very low head, e.g., about 5 meters or less, nevertheless often disturb natural ecosystems, particularly by disrupting upstream and downstream fish movements. Typical migratory riverine fish of concern include salmonids, clupeids, and eel. Juvenile downstream-migrating salmonids typically range between 130 mm-210 mm in length; adult post-spawn Atlantic salmon kelts returning to the sea typically range from 650 mm-800 mm in length. Downstream migrating eel can range from 650 mm-1500 mm in length. Juvenile blueback herring tend to be in the range of 75 mm-100 mm in length, and juvenile sturgeon typically range from 100 mm-300 mm in length.

The most significant risk factors causing mortality to fish passing downstream through conventional low-head turbines are blade impact and physical entrainment between moving and stationary components. Other mortality risk factors such as rate of pressure change, minimum static pressure, and fluid shear are generally less significant for fish entrained in low-head and very-low-head hydropower turbines as compared to medium-head or high-head turbines, e.g., head in excess of 30 meters, due to inherently low flow velocity and relatively high pressures at such low head. According to the von Raben equation, the probability of blade strike of fish passing through any turbine is proportional to the fish length ($L_f$), cosine of the angle between the axial flow velocity ($V_{axial}$) vector and the absolute water velocity vector, turbine speed (n), and the number of blades (Z), and inversely proportional to the axial flow velocity:

$$P(s) = \frac{L_f \cos\alpha Z \frac{n}{60}}{V_{axial}}$$

Figure 4:
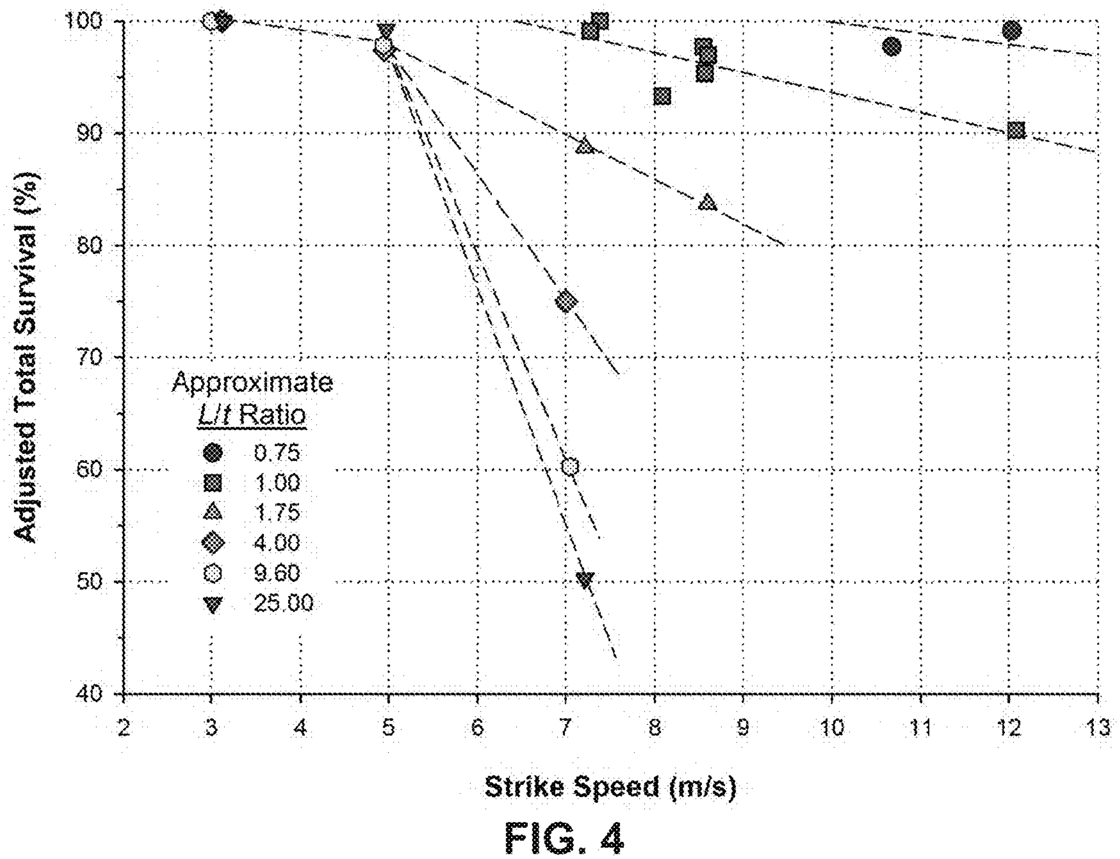
FIG. 4 is a scatter plot of adjusted total fish survival percentage versus strike speed for a range of fish length to blade thickness ratios.

FIG. 4 illustrates how fish survival after a blade strike event is sensitive to the ratio of fish body length to the thickness of the turbine blade leading edge and speed. The data in FIG. 4 corresponds to blades with straight leading edges, i.e., the leading edge is perpendicular to the direction of blade travel. Low fish length to blade thickness ratios ($L_f$/t) correspond to blades having relatively high thickness relative to the length of entrained fish. High fish length to blade thickness ratios correspond to relatively thin blades relative to the length of the entrained fish. As shown in FIG. 4, below strike speeds between approximately 3-5 m/s, all fish length to blade thickness ratios result in a high survival percentage—greater than 95%. Blades with a fish length to blade thickness ratio of >9.6 show survival below 50% at strike speed between 7-8 m/s trending toward 0% survival at strike speed of 12 m/s or greater. Blades with a fish length to blade thickness ratio <1 can allow strike survival of 100% at strike speed of 7 m/s and >90% at strike speed of 12 m/s.

Figure 1:
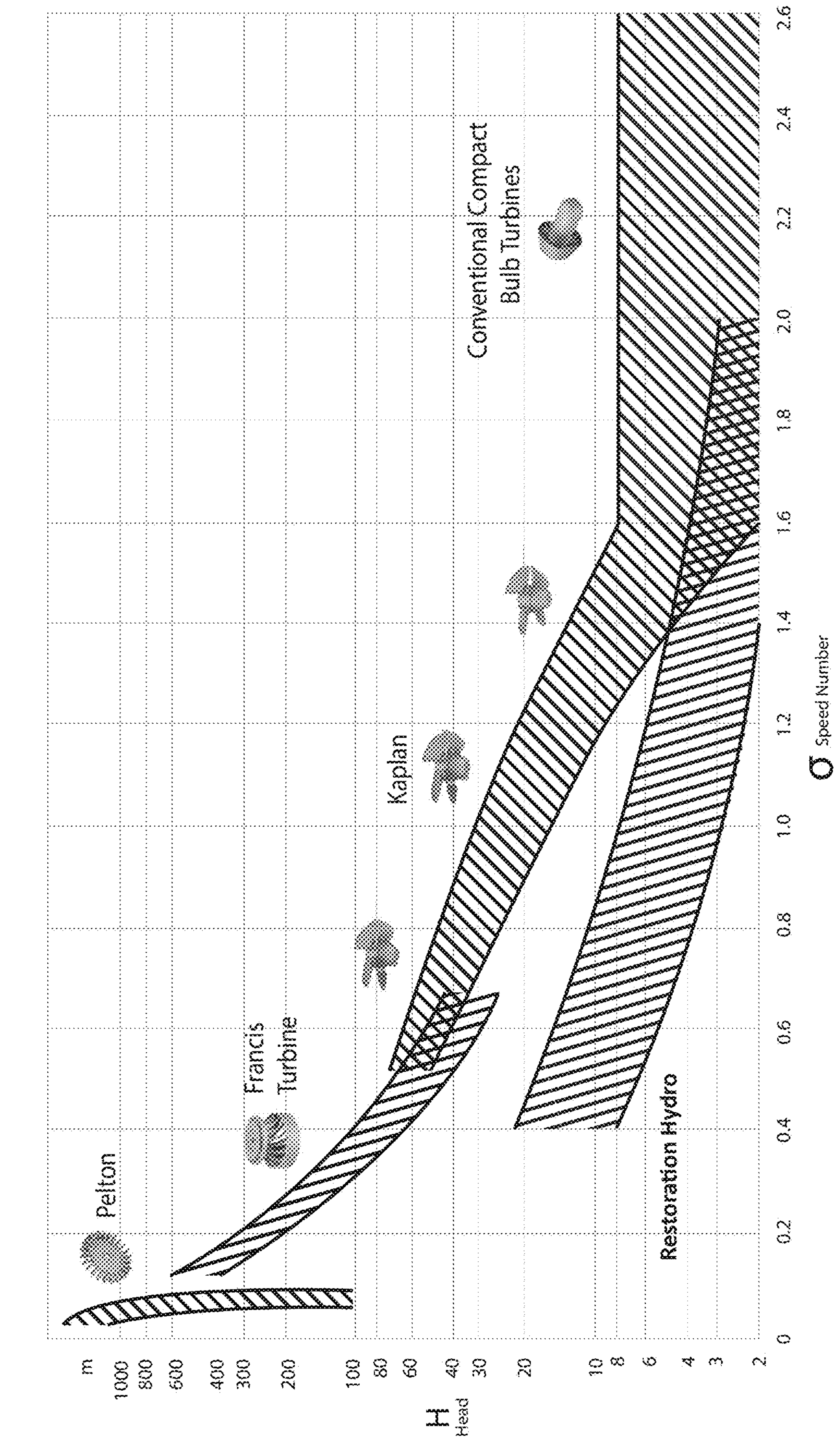
FIG. 1 is a plot of turbine dimensionless speed number vs. head.

Looking back to FIG. 1, hydraulic turbines are typically designed at a range of dimensionless speed numbers corresponding to the available hydraulic head. Various conventional turbines are shown on the plot, including the Pelton, Francis, Kaplan, and compact bulb turbines. The Restoration Hydro turbine is also shown.

Figure 2:
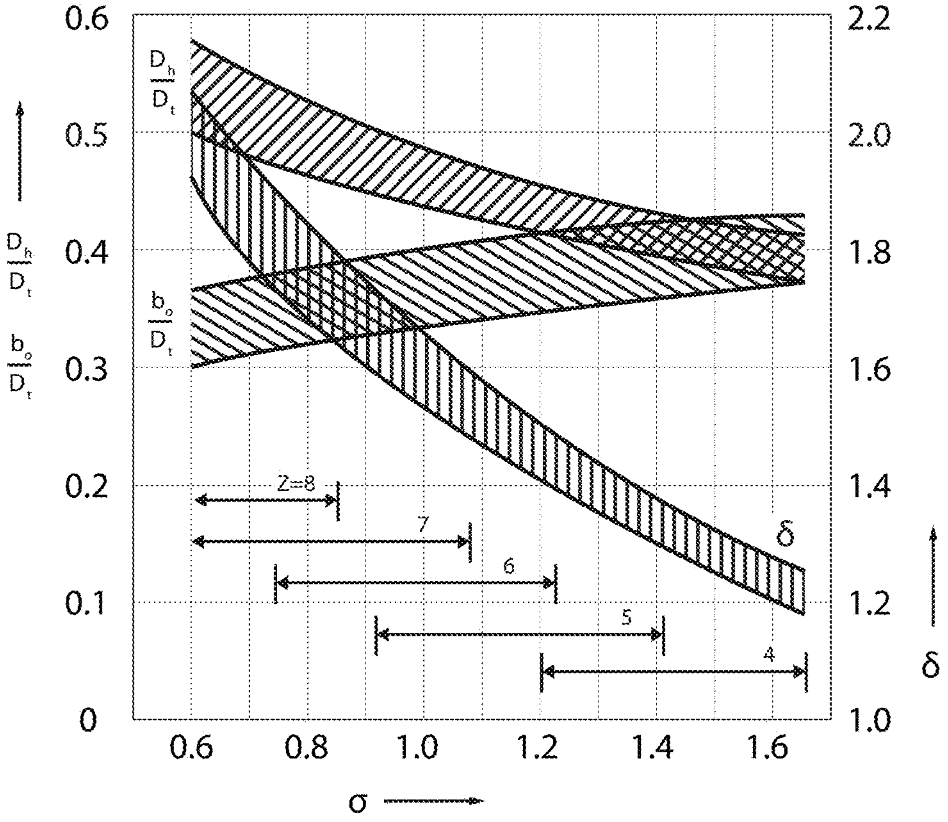
FIG. 2 is a plot of turbine design parameters versus dimensionless speed number.
Figure 3:
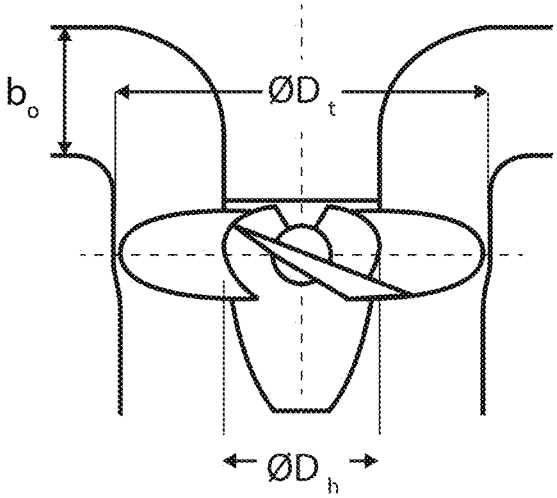
FIG. 3 is a diagram showing turbine design variables.

FIG. 2 is a nomograph exemplary of relationships commonly used in the design of conventional hydraulic turbines. The nomographs specify the typical ranges of design characteristics such as turbine dimensionless diameter number (δ) runner outer diameter ($D_t$), hub diameter ($D_h$), number of blades (Z), corresponding to a particular dimensionless speed. These characters are shown on an exemplary turbine in FIG. 3.

The speed number, σ, is directly proportional to the turbine shaft speed, n, and the square root of the flow rate, Q, and inversely proportional to the three-quarters power of head, H.

$$\sigma = \frac{2n\sqrt{\pi Q}}{(2gH)^{3/4}}$$

The dimensionless diameter number, δ, is proportional to the turbine diameter and the $4^{th}$ root of head, and inversely proportional to the $8^{th}$ root of the flow rate.

$$\delta = \frac{D_t\sqrt{\pi}}{2}\sqrt[4]{\frac{2gH}{Q^2}}$$

Typically, at the highest hydraulic head, very low dimensionless speed is utilized, while at low head, conventional turbines are designed with very high dimensionless speed. In part, this relationship allows for hydroelectric turbines to be built with direct coupling between the turbine runner and the electrical generator whose output frequency is well-matched to the frequency requirements of the electrical grid or load. Additionally, conventional low head turbines rely on fast runner speeds in order to, for example, reduce the size of the turbine as well as to reduce the size and cost of the generator and any speed increaser. At high head (greater than 100 meters), impulse turbines such as Pelton turbines are typically applied, with a speed number usually less than 0.1. At medium head (between 30-600 meters), mixed-flow reaction turbines such as Francis turbines are typically used, with speed number between 0.1 and 0.7. Axial flow turbines such as propeller or Kaplan turbines are commonly used above speed number of approximately 0.5, and at head less than 10 meters, very high speed numbers in excess of 1.5 are typically used.

Conventionally designed axial flow turbine blades typically utilize thin blades with a relatively sharp leading edge to reduce risk of cavitation and to reduce manufacturing cost. A conventional leading edge thickness is typically less than 3% of the runner diameter. For low-head and very-low-head hydropower plants, the combination of high shaft speed and small turbine dimensions create a challenge in promoting safe downstream passage of fish.

For example, from FIGS. 1-2, a conventionally-designed turbine intended for application at 3 meters of head generating 333 KW would have 3 or 4 blades with a runner diameter of approximately 1.73 meters, rotating at approximately 183 revolutions per minute, with a runner tip speed of approximately 16.7 m/s. Following conventional design principles, the relative velocity at the tip is approximately 16.4 m/s. The blade's leading edge thickness would be approximately 70 mm, and fish 300 mm in length (Lf/t of 5 per FIG. 7) passing the tip region will have probability of strike of 56%, according to the von Raben equation, and all fish struck will die, leading to a fish survival rate of 44%, as shown in FIG. 8, in the tip region.

Figure 6:
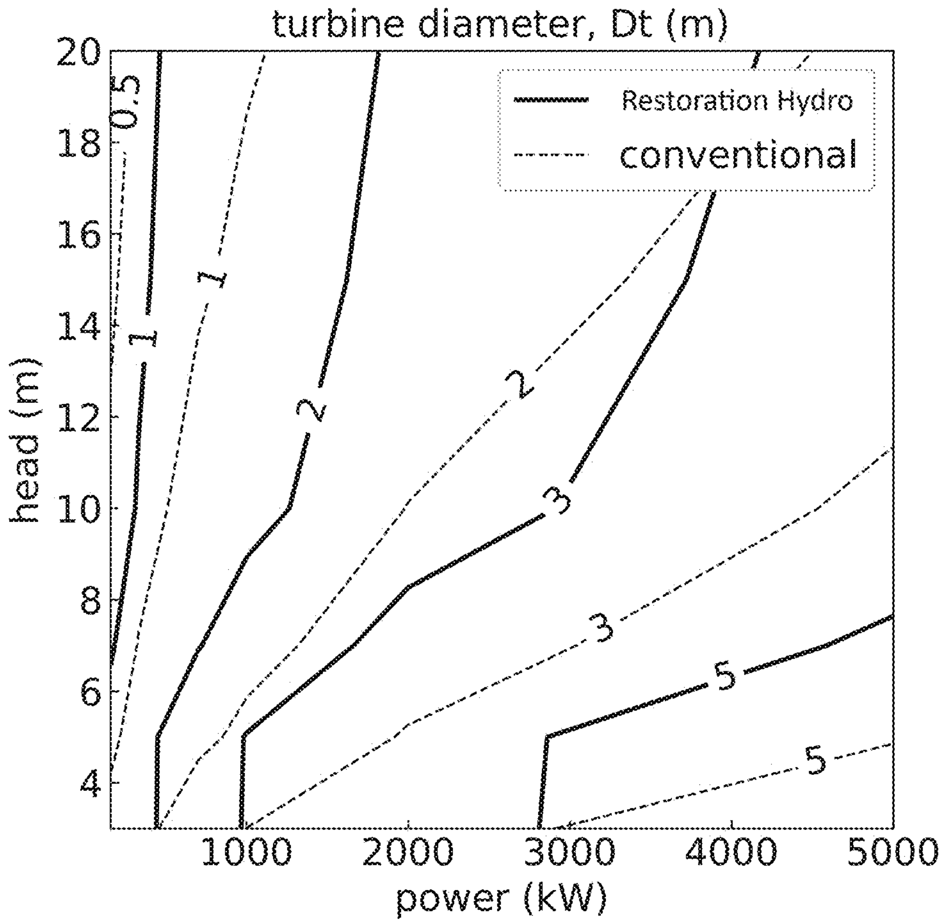
FIG. 6 is a contour plot of runner diameters required to produce a range of power at a range of head, for conventional and the Restoration Hydro turbines.

As another example, a turbine designed for application at 7 meters of head generating 700 KW, following conventional nomographs, would have 5 to 7 blades with a turbine diameter of approximately 1.5 meters per FIG. 6, rotating at approximately 300 revolutions per minute, with a runner tip speed of approximately 23 m/s. Following conventional design principles, the relative velocity at the tip is approximately 22 m/s. The blade's leading edge thickness would be approximately 60 mm; fish 300 mm in length (Lf/t of 6 per FIG. 7) passing the tip region will have probability of strike of 69%, according to the von Raben equation, and all fish struck will die, leading to a fish survival rate of 31%, in the tip region.

A typical turbine designed at speed number of 0.8 would typically be applied at no less than 25 meters and would have 6 to 8 blades, with diameter number, δ, of approximately 1.75 and a hub to tip diameter ratio of 0.5.

Because conventionally designed turbines are harmful to fish, hydropower facilities can require a protective intake screen to keep fish from entering the turbines. These fish screens are more costly than the usual "trash racks" that are normally used to protect hydropower turbines from damage by excluding foreign objects. Trash racks are typically comprised of long bars spaced in close proximity and arranged on a structure presenting a planar face to incoming flow. When not required to also exclude fish entrainment, these racks have bar spacing ranging from 35 mm-75 mm. Trash racks are able to exclude only very large fish. For example, a rack with 50 mm bar spacing may be able to exclude salmonids and clupeids above about 400 mm in length. Much finer bar spacing is required to exclude small fish; bar spacing between 19 mm-25 mm is required to exclude salmon smolt, and even finer spacing of 10 mm-12 mm is required to exclude eels. Fine fish exclusion screens require increased surface area and capital cost, and increased operating and maintenance cost as well as increased head loss compared to normal trash racks.

Conventional low-head turbines can also require a large draft tube to recover the head. This is because the fast runner speeds of conventional low-head turbines produce high exit velocity for water leaving the runner. For vertical axis turbines, the draft tube must bend 90 degrees with a complex three-dimensional form to ensure high performance through the shape transition. The excavation and civil works required to install a draft tube may be considerable. While horizontal axis turbines can have a lower civil works footprint than vertical axis turbines, the draft tube still represents a large component and cost. In some cases, the draft tube may need to be constructed of concrete, requiring extensive dewatering and custom framing. The high velocity of conventional low-head turbines also increases the susceptibility of these turbines to cavitation, and to prevent cavitation, the turbines are required to be submerged to an extent below the tailwater level. This increases construction cost.

Some embodiments of the present invention described herein provide a runner for a hydraulic turbine for low-head applications which allows for safe downstream passage of fish through a turbine incorporating the runner.

In some embodiments, a blade of the runner has a thick leading edge relative to a diameter of the runner, and relative to the fish allowed to pass through the turbine. As a result, a fish that encounters a blade of the runner is more likely to survive a blade impact relative to a fish that encounters a blade having a thinner leading edge relative to a diameter of the runner.

Additionally, in some embodiments, the ratio of maximum leading edge thickness to a diameter of the runner is greater at a tip of the runner blade than it is at a hub of the runner blade. In this way, the protective effect of a thick leading edge relative to a diameter of the runner is greatest in a region where blade speeds (and thus strike speeds) are highest.

In some embodiments, a leading edge of a blade of the runner is slanted forward relative to a radial axis of the runner. As a result, the normal component $w_N$ of the strike velocity is reduced, thereby reducing fish mortality from an impact with the blade.

In some embodiments, the runner is incorporated into a turbine. Water may enter the turbine from an open forebay or canal, or from a pipe or penstock, and may encounter guide vanes arranged for radial inflow, axial inflow, or a mixture of radial and axial flow directions. In some embodiments, the turbine is incorporated into a hydroelectric installation.

The disclosed Restoration Hydro turbines and runners do not follow conventional design principles. Instead, the Restoration Hydro turbines and runners discussed herein include a slightly larger runner diameter and operate at lower speed number than typical runners at the same power and head, but have significantly greater rate of fish survival due to significantly larger blade leading edge thickness to diameter ratio, and slanted leading edges which reduce the strike force felt by fish.

Figure 7:
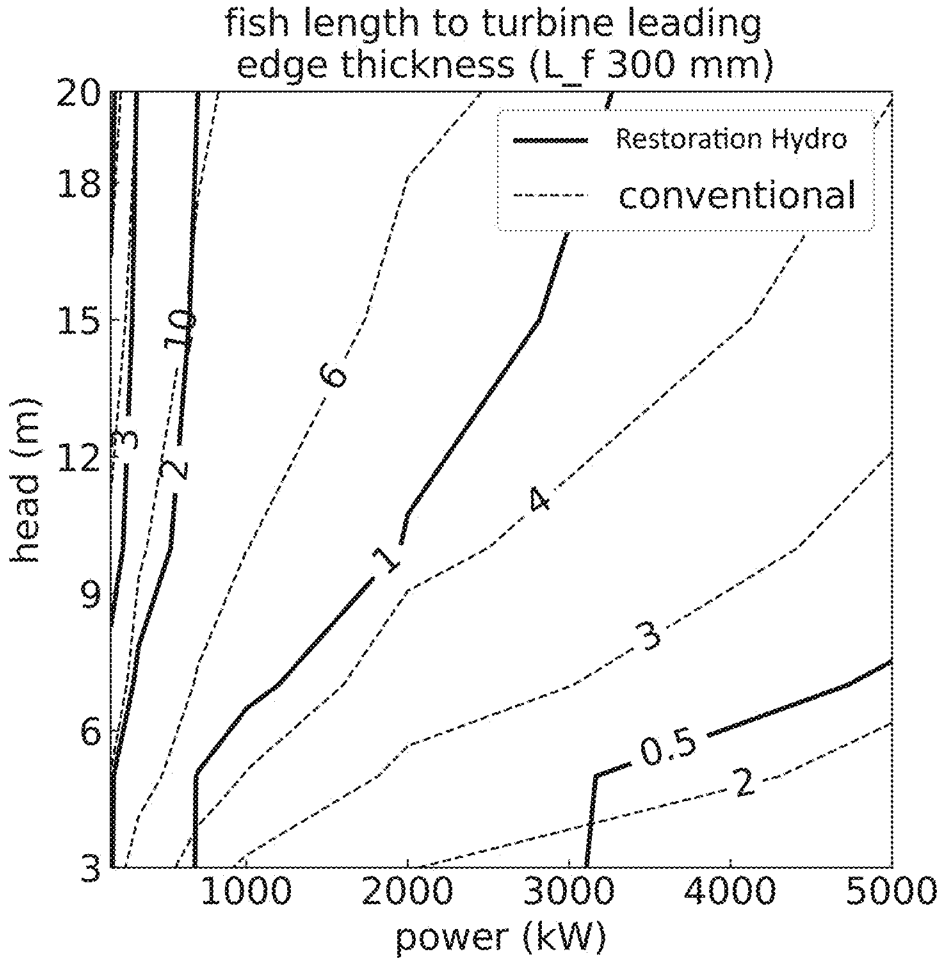
FIG. 7 is a contour plot of the ratio of fish length to turbine leading edge thickness for turbines required to produce a range of power at a range of head, for conventional and the Restoration Hydro turbines, assuming fish length of 300 mm and assuming a ratio of leading edge thickness to runner diameter of 0.035 for conventional turbines and 0.012 for Restoration Hydro turbines.

For example, from FIG. 1 and FIG. 7, the Restoration Hydro turbine designed for an application at 7 meters of head with a speed number of 0.8, producing 700 kW, will rotate at about 160 rpm, having a runner diameter of about 2 meters, tip speed of about 16.6 m/s, and relative fluid velocity W at the tip of about 13.6 m/s. With 3 blades and assuming 300 mm fish length, the turbine will have a strike probability of 42% according to the von Raben equation. Given a $t/D_t$ ratio of 0.12, the turbine's leading edge thickness is 238 mm with a tip slant angle of 25 degrees, resulting in a normal component of relative velocity $W_N$ of 5.8 m/s and 100% survival of fish passing the tip region.

In a second example, from FIG. 1 and FIG. 7, Restoration Hydro turbines and runners for a very-low-head application at 3 meters of head would have a speed number of 1.75. If sized to produce 333 KW, this turbine would have $D_t$ of 1.77 m, and rotate at 176 rpm; its tip speed would be 16.4 m/s with a relative fluid velocity W of about 15.8 m/s. Assuming 300 mm fish length, and 3 blades, this turbine has a strike probability at the tip of 45%, according to the von Raben equation, but with a tip slant angle of 20 degrees, the normal component of the relative velocity, $W_N$ 5.4 m/s, and given a $t/D_t$ ratio of 0.12 the turbine's leading edge thickness is 213 mm, 100% of the fish should survive. These and other embodiments are discussed below in more detail with reference to the figures.

FIGS. 9A-9F show a runner 900 according to some embodiments. Runner 900 can include a hub 910 and a plurality of blades 920 extending radially from hub 910.

As shown, for example, in FIG. 9A, hub 910 may have a cylindrical configuration. In another aspect, hub 910 can begin to taper underneath the runner. Blades 920 may be evenly spaced about a circumference of hub 910. In some embodiments, blades 920 are arranged helically on hub 910. In some embodiments, each of the plurality of blades 920 of runner 900 have the same shape and dimensions.

In the embodiment illustrated in FIG. 9A, runner 300 includes three blades 920. However, in other embodiments, runner 900 may include two blades 920 or may include more than three blades 920. A runner with relatively fewer blades 920 can contribute to decreased fish mortality.

In some embodiments, runner 900 may have a compact size. This may enable, for example, easy transport of runner 900. For example, a diameter $D_t$ of runner 900 may be at least about 0.5 meter. In an aspect, a diameter $D_t$ of runner 900 may range from about 0.5 meter to about 5 meters, such as about 1 meter to about 3 meters. A length Lr of runner 900 in longitudinal direction 950 may be, for example, about 1.7 meters to about 2.1 meters in length.

Each blade 920 of runner 900 can include a root 922 located at hub 910, a tip 924 opposite root 922 and defining an outermost extent of blade 920 in radial direction 960, a leading edge 926 at an upstream portion of runner 900, a trailing edge 928 at a downstream portion of runner 900, a pressure surface 930 on an upstream side of blade 920, and a suction surface 932 on a downstream side of blade 920.

Runner 900 may be configured to rotate in a circumferential direction 970 about longitudinal axis 950. In the embodiment shown in FIG. 9C, for example, circumferential direction 970 is counterclockwise when viewed from an upstream side of blade 920. However, in other embodiments, circumferential direction 970 may be clockwise when viewed from an upstream side of blade 920.

In some embodiments, runner 900 can operate at a range of speed numbers ranging from approximately 0.5 to approximately 2, such as approximately 0.8, which equates to a head range of approximately 2.5 meters to approximately 20 meters. For example, if runner 900 has diameter $D_t$ of 2 meters, and is operating under a net head of 7 meters, it may rotate at about 160 rpm. At such rotation rates, the turbine including runner 900 may have a hydraulic efficiency of at least about 80%, or at least about 85%, or at least about 90%.

In some embodiments, blades 920 may be shaped such that liquid passing through runner 900 in longitudinal direction 950 contacts at least one blade 920. Thus, as shown for example in FIG. 9C, blades 920 may partially overlap one another when viewed along a longitudinal axis 950 of runner 900. That is, when runner 900 is viewed along a longitudinal axis 950, a leading edge 926 of a first blade 920 can be disposed upstream of a trailing edge 928 of a second blade 920. In some embodiments, trailing edge 928 may be shaped to approximate the shape of leading edge 926.

In an aspect, the pitch of blades 920 can be adjustable to allow for a wider range of high efficiency operating conditions. In another aspect, blades 920 can include tip seals positioned between the runner blade tips and the housing. The tip seals can reduce bypass leakage flows and allow increased tolerances between the runner and housing. In a further aspect, runner 900 can include a rim attached to the outer diameter of blades 920 to reduce the instance of structural deflection.

Runner 900 and/or blades 920 may be made of any suitable material and may be formed by any suitable process. In some embodiments, runner 900 and/or blades 920 are made of molded carbon/fiberglass and resin. In such embodiments, blade 920 may include a core composed of a lightweight foam. In some embodiments, runner 900 is composed of metal, such as bronze, stainless steel, or the like, and may be formed by castings that are machined to the final shape. In some embodiments, runner 900 is composed of composites and is produced via conventional methods of composite construction. For example, runner 900 may have a sandwich composite construction or may include a shear web inside a structure. In some embodiments, runner 900 is composed of an elastomer or polymer, with reinforcements either locally or distributed throughout its interior.

Blade 920 may have a hybrid construction. In some embodiments, leading edge 926 of blade 920 is armored. Leading edge 926 may include a coating. Leading edge may be metallic. In some embodiments, blade tips 924 are molded with a thick layer of ablative material such that blades tips 924 can wear into the inner diameter of a housing of a turbine (shown, e.g., in FIGS. 15A-C). In a further aspect, leading edge 926 may be shaped as a saddle or hyperbolic paraboloid. The shape of leading edge 926 helps to reduce blade strike speed and also provides blade 920 with a high stiffness and a strong connection to hub 910. The shape of leading edge 926 further helps to prevent build-up or accumulation of debris at the location wherein root 922 of blade 920 meets hub 910 or at the blade tip 924 as no corner is formed.

As shown, for example, in FIGS. 9D-F, a cross section of blade 920 of runner 900 can be taken at hub 910 (FIG. 9F), at meridian 923 (FIG. 9E), or at tip 224 (FIG. 9D). Each cross section can have a chord length $L_c$ measured in a straight line from a leading edge 926 of blade 920 to trailing edge 928 of blade 920. Each cross section of blade 920 can have a leading edge thickness $t_{LE}$ and a maximum thickness $t_{max}$. Each cross section of blade 920 can have a camber line, C.

As shown, for example, in FIG. 9B, blade 920 may have a leading edge 926 with a maximum thickness $T_{LE}$ and a length $L_{LE}$. Blade 920 can have a chord length $L_c$.

In some embodiments, runner 900 has a blade with a large ratio of leading edge thickness $T_{LE}$ to runner diameter $D_t$ (i.e., $T_{LE}/D_t$) relative to a conventional low-head runner design. $T_{LE}/D_t$ can be approximately 0.06 to approximately 0.35, such as approximately 0.08 to approximately 0.25, such as approximately 0.1 to approximately 0.14. For example, runner 900 can have a diameter $D_t$ of approximately 1.75 meters and blade 920 can have a leading edge thickness $T_{LE}$ of about 145 mm to about 350 mm, or about 170 to 300 mm, or about 190 to 250 mm. Such a runner can have a $T_{LE}/D_t$ ratio of approximately 0.0.06 to approximately 0.35, such as approximately 0.08 to approximately 0.25, such as approximately 0.1 to approximately 0.14. As another example, runner 900 can have a diameter $D_t$ of approximately 2.75 meters and blade 920 can have a leading edge thickness $T_{LE}$ of about 230 mm to about 550 mm, or about 250 mm to 500 mm, or about 275 mm to 450 mm. Such a runner can have a $T_{LE}/D_t$ ratio of approximately 0.06 to approximately 0.35, such as approximately 0.08 to approximately 0.25, such as approximately 0.1 to approximately 0.14. A ratio of a length $L_{LE}$ of the turbine runner to a diameter of the turbine $D_t$ may be about 0.25 to about 0.75, such as between about 0.58 and 0.65, for a runner with 3 blades. In an aspect, the runner can have a ratio of the hub diameter, $D_h$, to the tip diameter $D_t$, of about 0.35 to about 0.5, such as about 0.37 to about 0.42.

As mentioned above, fish mortality may result from leading edge 926 of a blade 920 of a runner 900 striking a fish 3000 as runner 900 rotates about longitudinal axis 950 of runner 900. A runner 900 with $T_{LE}/D_t$ ratio in the ranges noted above results in increased fish survival percentage (decreased fish mortality) relative to a conventional runner.

Generally, increasing blade thickness may reduce the amount of liquid that can flow through runner 900, thereby reducing power specific speed of runner 900. Additionally, increasing blade thickness may increase local curvature of the blade which may increase the risk of cavitation due to local low pressure zones. These problems are overcome in some embodiments of the Restoration Hydro turbine and runner by using a small number of blades, allowing for thick blades without removing a substantial fraction of the turbine flow area, and with gradual distribution of thickness along the camber line.

In some embodiments, leading edge thickness $T_{LE}$ of blade 920 at leading edge 926 may be the same as or greater than a length of a fish species of interest in the region in which a turbine including runner 900 is to be installed. For example, salmon smolt have a length that is an average of about 100 to 200 mm. Accordingly, the leading edge thickness $T_{LE}$ of blade 920 intended to be used in a region with salmon smolt may be 100 mm to 200 mm or more.

In some embodiments, a ratio of chord length at hub 910 ($L_{C,\ h}$) to a diameter of runner 900 ($D_t$) (i.e., $L_{C,\ h}/D_t$) can be approximately 0.55 to approximately 0.75, such as approximately 0.6 to approximately 0.64. In some embodiments, a ratio of chord length at tip 924 ($L_{C,\ t}$) to a diameter of runner 900 ($D_t$) (i.e., $L_{C,\ t}/D_t$) can be approximately 1.0 to approximately 1.7, such as approximately 1.4 to approximately 1.6.

In some embodiments, a ratio of chord length at hub 910 ($L_{C,\ h}$) to leading edge length ($L_{LE}$) (i.e., $L_c$, $h/L_{LE}$) can be approximately 1.5 to approximately 1.8. In some embodiments, a ratio of chord length at tip 924 ($L_{C,\ t}$) to leading edge length $L_{LE}$ (i.e., $L_{C,t}/L_{LE}$) can be approximately 2.5 to approximately 3.75.

In some embodiments, a ratio of chord length at hub 910 ($L_{C,\ h}$) to circumferential spacing (CS) (i.e., $L_{C,h}$/CS) can be approximately 1.35 to approximately 1.55, such as approximately 1.48 to approximately 1.53. In some embodiments, a ratio of chord length at tip 924 ($L_{C,\ t}$) to circumferential spacing (CS) (i.e., $L_{C,\ t}$/CS) can be approximately 0.9 to approximately 1.6, such as approximately 1.35 to approximately 1.5.

In some embodiments, a ratio of maximum thickness at hub 910 ($t_{max,h}$) to a diameter of runner 900 ($D_t$) (i.e., $t_{max}$,h/$D_t$) can be approximately 0.25 to approximately 0.35, such as approximately 0.3 to approximately 0.33. In some embodiments, a ratio of maximum thickness at tip 224 ($t_{max}$,t) to a diameter of runner 900 ($D_t$) (i.e., $t_{max,t}/D_t$) can be approximately 0.1 to approximately 0.25, such as approximately 0.15 to approximately 0.17. A runner 900 with ratios within the ranges noted above results in decreased fish mortality relative to a conventional runner. In some embodiments, a ratio of maximum thickness at hub 910 ($t_{max,h}$) to chord length ($L_{C,h}$) is approximately 0.25 to approximately 0.35, such as approximately 0.3 to approximately 0.33. In some embodiments, a ratio of maximum thickness at tip 924 ($t_{max,t}$) to chord length ($L_{C,t}$) is approximately 0.1 to approximately 0.25, such as approximately 0.15 to approximately 0.17.

In some embodiments, blade 920 can have a camber ratio of the maximum distance, $b_h$, of the camber line, $C_h$, to the chord line, $L_{C,h}$, at hub 910 of approximately 0.05 to approximately 0.15, such as approximately 0.097. In some embodiments, blade 920 can have a camber ratio of the maximum distance, $b_t$, of the camber line, $C_t$, to the chord line, $L_{C,t}$, at tip 924 of approximately 0 to approximately 0.005.

As shown, for example, in FIG. 9D-F, leading edge 926 may have a cross section based on an arc of a cylinder. In some embodiments, leading edge 926 may have a cross section based on a circle, an ellipse, or another shape.

As shown, for example, in FIGS. 9D-F, thickness of blade 920 can taper from leading edge 926 toward trailing edge 928. Thickness of blade 920 may be tapered such that pressure surface 930 and suction surface 932 intersect at a point at trailing edge 928 of blade 220. Blade 920 can also have a consistent thickness from the root 922 to tip 924. In another aspect, the thickness of blade 920 can be variable. In some embodiments, the thickness of blade 920 is greater at tip 924 of blade 920 than at hub 910. As discussed above, the velocity of blade 920 increases from root 922 to hub 924. As a result, the strike velocity of blade 920 encountering fish 3000 near tip 924 is greater than the strike velocity of blade 920 encountering fish 3000 near root 922. Thus, increasing $T_{LE}$/D of blade 920 at tip 924 reduces mortality in regions where fish 3000 is most likely to experience a fatal impact.

As shown, for example, in FIGS. 9A-F, blade 920 of runner 900 can have a leading edge 926 that is slanted at an angle θ at one or more locations t, m, h along leading edge 926. A curve can be drawn along the apex of the stagnation region of the blade from hub to tip, defining the leading edge of the blade. A tangent line drawn at any point along this curve, can be measured relative to a cylindrical surface, coaxial with the turbine runner rotation axis, which intersects the point. The slant angle is measured between the tangent line, and a vector lying on the cylindrical surface, perpendicular to the leading edge and coincident with the leading edge intersection point (this vector being approximately equivalent to the direction of the fluid relative velocity vector during normal operation).

Fish mortality is a function of the normal component $w_N$ of the strike velocity at impact. Therefore, reducing the normal component $w_N$ of the strike velocity at impact results in reduced fish mortality.

The normal component of velocity may be determined by the formula:

$$w_N = w\sin(\theta_1)$$

Figure 5:
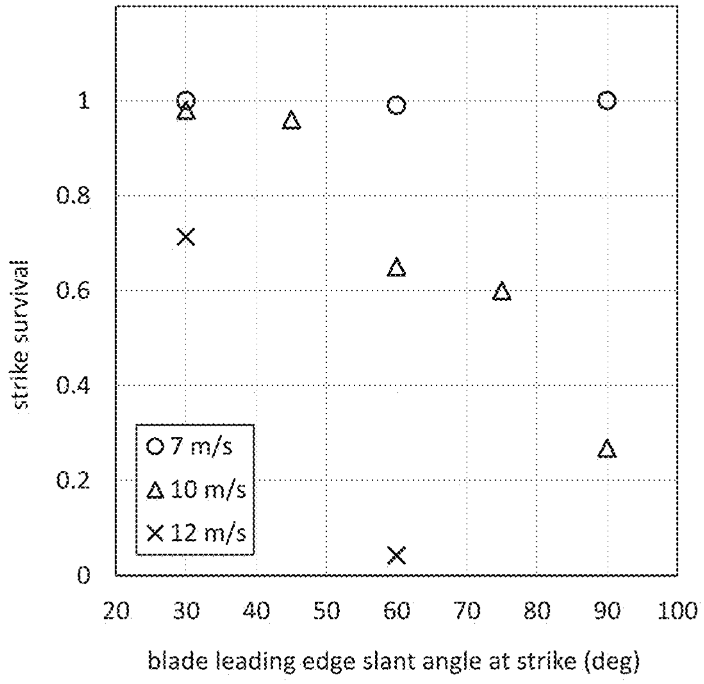
FIG. 5 is a scatter plot of the total fish survival percentage versus blade leading edge slant angle at strike for a range of strike speeds.

Accordingly, the normal component $w_N$ of the strike velocity is reduced for angles θ other than 90 degrees. Thus, fish mortality is reduced relative to a blunt blade at leading edge locations having a slant angle θ other than 90 degrees. Indeed, empirical data supports these results. FIG. 5 shows a plot of leading edge strike angle vs. total survival (%) at different blade strike velocities. As shown, for the blade velocities tested, survival generally declines between a 30° slant angle position and a 90° slant angle position.

In some embodiments, leading edge 926 at a location may be slanted at an angle θ of about 25 to about 45 degrees. In some embodiments, leading edge 926 at a location may be slanted at an angle θ of about 30 degrees. At an angle θ of 30 degrees, the normal component $w_N$ of the strike velocity is half the strike velocity w. Thus, for example, at a free stream relative velocity w of 12 m/s, the normal component of the velocity $w_N$ at a blade angle θ of 30° is 6 m/s. In some embodiments, leading edge 926 may be slanted at tip 924. As mentioned, strike speed increases from root 922 of blade 920 to tip 924 of blade 920, such that tip 924 of blade 920 has the greatest strike speed. Thus, providing leading edge 926 with a slant angle θ at tip 924 of blade 922 may reduce mortality where fish 3000 would otherwise be more likely to experience a fatal impact. Providing a slanted leading edge 926 at tip 924 may also, for example, help to prevent build-up or accumulation of debris at tip 924.

In low head applications, the force at tip 924 of leading edge 926 may be sufficiently low such that a sufficiently high degree of fish safety is maintained even with a larger blade angle of about 45°. In higher head applications, runner 900 operates at higher speeds, which increases the strike speed. In order to reduce the normal component W of the strike velocity at higher rotational speeds, a steeper angle, e.g., about 35° or lower, may be required to reduce the normal component of strike speed to a desired level, e.g., below about 7 m/s, to maintain a sufficiently high degree of fish safety.

In some embodiments, leading edge 926 may be slanted at a location between root 922 and tip 924. For the same reasons discussed above with respect to providing leading edge 926 with a slant angle at tip 924, providing leading edge 926 with a slant angle θ in a region between root 922 and tip 924 may reduce mortality where fish 3000 may be relatively likely to experience a fatal impact.

In some embodiments, for example, as shown in FIG. 9C, slant angle θ at tip 924 of blade 922 may be smaller than slant θ at root 920 and/or a location between root 922 and tip 924.

In some embodiments, for example as shown in FIG. 9C, leading edge 926 may be slanted at root 922. The slant angle of leading edge 926 of blade 920 at root 922 may be, for example, about 10 degrees to about 90 degrees, such as about 25 to about 45 degrees. In addition to improving survival of fish 3000 impacting blade 920 at root 922, providing a slanted leading edge 926 at root 922 may also, for example, help to prevent build-up or accumulation of debris where root 922 of blade 920 meets hub 910.

In some embodiments, for example, as shown in FIG. 9B, leading edge 926 of blade 920 may be slanted such that leading edge 926 is arc-shaped. In other embodiments, leading edge 926 may have a C-shape, a semi-circular shape, a parabolic shape, a conic shape, or some other shape.

In some embodiments, for example, as shown in FIG. 9C, leading edge 926 of blade 920 may curve toward trailing edge 928 of blade 920 near hub 910 such that leading edge 926 has a concave shape. This may allow, for example, smaller angles to be achieved at tip 924 without creating a cantilevered tip, as will be discussed in more detail. In some embodiments, for example, as shown in FIGS. 9A-F, leading edge 926 of blade 920 at root 922 may be slanted at a first angle θ, and leading edge 926 of blade 920 at tip 924 may be slanted at the same angle θ.

In some embodiments, root 922 of leading edge 926 of blade 920 and tip 924 of leading edge 926 of blade 920 may both be positioned along radial axis 960. However, in other embodiments, root 922 of leading edge 926 of blade 920 is positioned along a radial axis 960 of runner 900, and tip 924 of leading edge 926 extends beyond radial axis 960 in circumferential direction 970. Thus, leading edge 926 of blade 920 can be cantilevered. As tip 924 at leading edge 926 extends farther beyond radial axis 960 in circumferential direction 970, a smaller angle can be achieved. As discussed, this can result in a lower normal component of strike velocity $w_N$ at impact. However, as the angle continues to decrease, the structural stiffness of the blade may also decrease. This may result in increased manufacturing costs to maintain minimum structural stiffness requirements for the blade. Structural stiffness may be required, for example, to retain tip 924 of blade 920 in the tight tolerances of housing of a turbine.

In some embodiments, runner 900 is configured to rotate such that a strike speed is about 7 m/s or less in order to allow for safe fish passage. By providing a slanted leading 926, the strike speed is effectively reduced, allowing runner 900 to rotate at a higher speed to improve power specific speed and economic competitiveness of runner 900 while maintaining safe fish passage.

As discussed above, fish mortality may result from leading edge 926 of a blade 920 of a runner 900 striking a fish as runner 900 rotates about longitudinal axis 950. The more blades on a runner, the more likely a fish is to be struck by a blade while passing through the turbine. Thus, reducing the number of blades generally results in decreased fish mortality. Reducing the number of blades 920 on runner 900 may also reduce the rotor solidity (the ratio of the total area of the rotor blades to the swept area of the rotor) and thus blockage of flow of liquid through runner 900.

Further, a runner 900 having fewer blades 920 may be configured to have increased blade thickness relative to a runner having additional blades while allowing the same amount of liquid to pass through the runner. For example, a runner 900 having two blades 920 may have a higher leading edge thickness $T_{LE}$, and a sufficiently high degree of fish safety, in comparison to a runner 900 having three blades 920 while maintaining the same flow of liquid through runner 900.

However, a runner having fewer blades generally has a greater axial length than a runner with additional blades, assuming the blade spacing-to-chord ratio is kept constant, and since the runner with fewer blades will have blades with a larger chord length. For example, the ratio of fish length to blade leading edge thickness must increase as blade quantity increases if the design maintains uniform blade blockage. Thus, the number of blades selected for a particular runner may depend upon a variety of considerations.

FIGS. 10A-10G show a runner 1000 according to an embodiment. Runner 1000 can include some or all of the features, structures, or characteristics discussed above with respect to runner 900.

Runner 1000 can include a hub 1010 and a plurality of blades 1020 extending radially from hub 1010. Each blade 1020 of runner 1000 can include a root 1022 located at hub 1010, a tip 1024 opposite root 1022 and defining an outermost extent of blade 1020 in radial direction 1060, a leading edge 1026 at an upstream portion of runner 1000, a trailing edge 1028 at a downstream portion of runner 1000, a pressure surface 1030 on an upstream side of blade 1020, and a suction surface 1032 on a downstream side of blade 1020. Runner 1000 can be configured to rotate in a circumferential direction 1070 about longitudinal axis 1050. As shown, for example in FIG. 10C, circumferential direction 1070 is counterclockwise when viewed from an upstream side of runner 1000. However, in other embodiments, circumferential direction 1070 may be clockwise when viewed from an upstream side of runner 1000.

In some embodiments, runner 1000 can operate at a range of speed numbers, σ, ranging from approximately 0.5 to approximately 2, such as approximately 0.8. For example, if runner 200 has diameter $D_t$ of 2 meters and is operating under a net head of 7 meters, it may rotate at about 160 rpm.

Hub 1010 has a cylindrical configuration that tapers inward at one end. As shown, for example, in FIG. 10B, hub 1010 begins to taper within the span of blades 1020 (i.e., hub 1010 is tapered where blades 1020 meet hub 1010). However, in other embodiments, hub 1010 begins to taper downstream of blades 1020. A taper than begins within the span of blades 1020 can, for example, result in an overall reduction in the runner length (as compared to a runner with a hub that begins to taper downstream of blades 1020). In turn, reduction in runner length can lead to lower manufacturing and/or installation costs. The rate at which hub 1010 tapers inward can be different than that shown, for example, in FIG. 10B. A steep taper can cause flow to separate and cause adverse conditions downstream of the turbine leading to efficiency losses. A shallow taper can result in an unnecessarily large runner and/or in unnecessary material or manufacturing costs.

Runner 1000 includes three blades 1020. However, in other embodiments, runner 1000 may include two blades 1020 or may include more than three blades 1020. As discussed above, providing relatively few blades can result in decreased fish mortality and reduced rotor solidity (the ratio of the total area of the rotor blades to the swept area of the rotor) and thus blockage of flow through runner 1000. Blades 1020 may be evenly spaced about a circumference of hub 1010. In some embodiments, blades 1020 are arranged helically on hub 1010. In some embodiments, each of the plurality of blades 1020 of runner 1000 have the same shape and dimensions.

Blade 1020 has a thick straight leading edge. The thick leading edge promotes fish safety, while the advantage of building a blade in this manner is in structural simplicity compared to a runner with a cantilevered leading edge. However, in order to maximize efficiency, a larger number of blades may be required in order to maintain sufficient solidity at the tip. In doing so, the runner power specific speed will be reduced (it will produce less power at the same head and given the same diameter) compared to a slanted runner with the same leading edge thickness and solidity.

Blade 1020 has a relatively straight leading edge 1026, emerging radially from the hub. A blade with a relatively straight leading edge, such a leading edge 1026, may be relatively easy or inexpensive to manufacture compared to a blade with a slanted leading edge.

Blade 1020 may have leading edge thickness $T_{LE}$ and a length $L_{LE}$. The ratio of leading edge thickness $T_{LE}$ to runner diameter $D_R$ (i.e., $T_{LE}/D_R$) of runner 1000 is large relative to a conventional low-head runner design. $T_{LE}/D_t$ can be approximately 0.06 to approximately 0.35, such as approximately 0.08 to approximately 0.25, such as approximately 0.1 to approximately 0.14. As discussed, this $T_{LE}/D_R$ ratio results in decreased fish mortality relative to a conventional runner.

As shown, for example, in FIGS. 10D-F, a cross section of blade 1020 of runner 1000 can be taken at hub 1010 (FIG. 10F), at meridian 1023 (FIG. 10E), or at tip 1024 (FIG. 10D). Each cross section can have a chord length $L_c$. Each cross section of blade 1020 can have a maximum thickness $t_{max}$. Each cross section of blade 1020 can have a camber line, C. Blade 1020 can have a chord length, $L_c$.

In some embodiments, a ratio of chord length at hub 1010 ($L_{C,h}$) to a diameter of runner 1020 ($D_t$) (i.e., $L_{C,h}/D_t$) can be approximately 0.55 to approximately 0.75, such as approximately 0.6 to approximately 0.64. In some embodiments, a ratio of chord length at tip 1024 ($L_{C,t}$) to a diameter of runner 1000 ($D_t$) (i.e., $L_{C,t}/D_t$) can be approximately 1.0 to approximately 1.7, such as approximately 1.4 to approximately 1.6.

In some embodiments, a ratio of chord length at hub 1010 ($L_{C,h}$) to leading edge length ($L_{LE}$) (i.e., $L_{C,h}/L_{LE}$) can be approximately 1.5 to approximately 1.8. In some embodiments, a ratio of chord length at tip 1024 ($L_{C,t}$) to leading edge length $L_{LE}$ (i.e., $L_c$, $t/L_{LE}$) can be approximately 2.5 to approximately 3.75.

In some embodiments, a ratio of chord length at hub 1010 ($L_{C,h}$) to circumferential spacing (CS) (i.e., $L_{C,h}$/CS) can be approximately 1.35 to approximately 1.55, such as approximately 1.48 to approximately 1.53. In some embodiments, a ratio of chord length at tip 1024 ($L_{C,t}$) to circumferential spacing (CS) (i.e., $L_{C,t}$/CS) can be approximately 0.9 to approximately 1.6, such as approximately 1.35 to approximately 1.5. In some embodiments, a ratio of maximum thickness at hub 1010 ($t_{max,h}$) to a diameter of runner 1000 ($D_t$) (i.e., $t_{max,h}/D_t$) can be approximately 0.25 to approximately 0.35, such as approximately 0.3 to approximately 0.33. In some embodiments, a ratio of maximum thickness at tip 1024 ($t_{max,t}$) to a diameter of runner 1000 ($D_t$) (i.e., $t_{max,t}/D_t$) can be approximately 0.1 to approximately 0.25, such as approximately 0.15 to approximately 0.17. A runner 1000 with ratios within the ranges noted above results in decreased fish mortality relative to a conventional runner.

In some embodiments, a ratio of maximum thickness at hub 1010 ($t_{max,h}$) to chord length ($L_{C,h}$) is approximately 0.25 to approximately 0.35, such as approximately 0.3 to approximately 0.33. In some embodiments, a ratio of maximum thickness at tip 1024 ($t_{max,t}$) to chord length ($L_{C,t}$) is approximately 0.1 to approximately 0.25, such as approximately 0.15 to approximately 0.17.

In some embodiments, blade 1020 can have a camber ratio of the maximum distance, $b_h$, of the camber line, $C_h$, to the chord line, $L_{C,h}$, at hub 1010 of approximately 0.05 to approximately 0.15, such as approximately 0.097. In some embodiments, blade 1020 can have a camber ratio of the maximum distance, $b_t$, of the camber line, $C_t$, to the chord line, $L_{C,t}$, at tip 1024 of approximately 0 to approximately 0.005.

In some embodiments, blades 1020 may be shaped such that liquid passing through runner 1000 in longitudinal direction 1050 contacts at least one blade 1020, as discussed above with respect to FIGS. 9A-F. In some embodiments, trailing edge 1028 may be shaped to approximate the shape of leading edge 1026.

FIGS. 11A-11G show a runner 1100 according to an embodiment. Runner 1100 can include some or all of the features, structures, or characteristics discussed above with respect to runner 900.

Runner 1100 can include a hub 1110 and a plurality of blades 1120 extending radially from hub 1110. Each blade 1120 of runner 1100 can include a root 1122 located at hub 1110, a tip 1124 opposite root 1122 and defining an outermost extent of blade 1120 in radial direction 1160, a leading edge 1126 at an upstream portion of runner 1100, a trailing edge 1128 at a downstream portion of runner 1100, a pressure surface 1130 on an upstream side of blade 1120, and a suction surface 1132 on a downstream side of blade 1120. Runner 1100 can be configured to rotate in a circumferential direction 1170 about longitudinal axis 1150. As shown, for example in FIG. 11C, circumferential direction 1170 is counterclockwise when viewed from an upstream side of runner 1100. However, in other embodiments, circumferential direction 1170 may be clockwise when viewed from an upstream side of runner 1100.

Blade 1120 has a straight leading edge which changes in thickness from hub to tip. The leading edge thickness is larger at the tip than at the hub. This enables a lower $Lf/t_{LE}$ at the location where strike speed is highest. In this manner, material and space is efficiently utilized. Additionally, the thicker blade cross section acts to increase the effective solidity of the runner blade cascade, potentially allowing usage of a smaller number of blades (e.g. 3 rather than 4 blades). A straight leading edge enables simpler structural requirements compared to a blade with cantilevered leading edge. For example, it takes less material and will cost less in manufacturing a runner meeting criteria for minimal radial deflections under centripetal loading, with a straight leading edge compared to a blade with a cantilevered leading edge.

In some embodiments, runner 1100 can operate at a range of speed numbers, σ, ranging from approximately 0.5 to approximately 2, such as approximately 0.8, which equates to a head range of approximately 2.5 meters to approximately 20 meters. For example, if runner 200 has diameter $D_t$ of 2 meters and is operating under a net head of 7 meters, it may rotate at about 160 rpm.

Hub 1110 has a cylindrical configuration that tapers inward at one end. As shown, for example, in FIG. 11B, hub 1110 begins to taper within the span of blades 1120 (i.e., hub 1110 is tapered where blades 1120 meet hub 1110). However, in other embodiments, hub 1110 begins to taper downstream of blades 1120. Runner 1100 includes three blades 1120. However, in other embodiments, runner 1100 may include two blades 1120 or may include more than three blades 1120. As discussed above, providing relatively few blades can result in decreased fish mortality and reduced rotor solidity (the ratio of the total area of the rotor blades to the swept area of the rotor) and thus blockage of flow through runner 1100. Blades 1120 may be evenly spaced about a circumference of hub 1110. In some embodiments, blades 1120 are arranged helically on hub 1110. In some embodiments, each of the plurality of blades 1120 of runner 1100 have the same shape and dimensions.

Blade 1120 has a relatively straight leading edge 1126. A blade with a relatively straight leading edge, such a leading edge 1126, may be relatively easy or inexpensive to manufacture compared to a blade with a slanted leading edge.

Blade 1120 may have leading edge thickness $T_{LE}$ and a length $L_{LE}$. The ratio of leading edge thickness to runner diameter (i.e., $T_{LE}/D_t$) of runner 1100 is about 0.125 In other embodiments, $T_{LE}/D_t$ can be approximately 0.06 to approximately 0.35, such as approximately 0.08 to approximately 0.25, such as approximately 0.1 to approximately 0.14. As discussed, this $T_{LE}$, max/$D_t$ ratio results in decreased fish mortality relative to a conventional runner.

As shown, for example, in FIGS. 11D-11F, the ratio of leading edge thickness to runner diameter (i.e., $T_{LE}/D$) of blade 1120 can be greater at tip 1124 of blade 1120 than at hub 1110 of blade 1120. As discussed above, strike speed increases from root 1122 to hub 1124. Thus, increasing $T_{LE}/D$ of blade 1120 at tip 1124 reduces mortality in regions where fish are most likely to experience a fatal impact.

As shown, for example, in FIGS. 11D-F, a cross section of blade 1120 of runner 1100 can be taken at hub 1110 (FIG. 11F), at meridian 1123 (FIG. 11E), or at tip 1124 (FIG. 11D). Each cross section can have a chord length $L_c$. Each cross section of blade 1120 can have a maximum thickness $t_{max}$. Each cross section of blade 1120 can have a camber line, C. Blade 1120 can have a chord length, $L_c$.

In some embodiments, a ratio of chord length at hub 1110 ($L_{C,h}$) to a diameter of runner 1120 ($D_t$) (i.e., $L_{C,h}/D_t$) can be approximately 0.55 to approximately 0.75, such as approximately 0.6 to approximately 0.64. In some embodiments, a ratio of chord length at tip 1024 ($L_{C,t}$) to a diameter of runner 1000 ($D_t$) (i.e., $L_{C,t}/D_t$) can be approximately 1.0 to approximately 1.7, such as approximately 1.4 to approximately 1.6.

In some embodiments, a ratio of chord length at hub 1110 ($L_{C,h}$) to leading edge length ($L_{LE}$) (i.e., $L_{C,h}/L_{LE}$) can be approximately 1.5 to approximately 1.8. In some embodiments, a ratio of chord length at tip 1124 ($L_{C,t}$) to leading edge length $L_{LE}$ (i.e., $L_c$, $t/L_{LE}$) can be approximately 2.5 to approximately 3.75.

In some embodiments, a ratio of chord length at hub 1110 ($L_{C,h}$) to circumferential spacing (CS) (i.e., $L_{C,h}$/CS) can be approximately 1.35 to approximately 1,55, such as approximately 1.48 to approximately 1.53. In some embodiments, a ratio of chord length at tip 1124 ($L_{C,t}$) to circumferential spacing (CS) (i.e., $L_{C,t}$/CS) can be approximately 0.9 to approximately 1.6, such as approximately 1.35 to approximately 1.5. In some embodiments, a ratio of maximum thickness at hub 1110 ($t_{max,h}$) to a diameter of runner 1100 ($D_t$) (i.e., $t_{max,h}/D_t$) can be approximately 0.25 to approximately 0.35, such as approximately 0.3 to approximately 0.33. In some embodiments, a ratio of maximum thickness at tip 1124 ($t_{max,t}$) to a diameter of runner 1100 ($D_t$) (i.e., $t_{max,t}/D_t$) can be approximately 0.1 to approximately 0.25, such as approximately 0.15 to approximately 0.17. A runner 1100 with ratios within the ranges noted above results in decreased fish mortality relative to a conventional runner.

In some embodiments, a ratio of maximum thickness at hub 1110 ($t_{max,h}$) to chord length ($L_{C,h}$) is approximately 0.25 to approximately 0.35, such as approximately 0.3 to approximately 0.33. In some embodiments, a ratio of maximum thickness at tip 1124 ($t_{max,t}$) to chord length ($L_{C,t}$) is approximately 0.1 to approximately 0.25 such as approximately 0.15 to approximately 0.17.

In some embodiments, blade 1120 can have a camber ratio of the maximum distance, $b_h$, of the camber line, $C_h$, to the chord line, $L_{C,h}$, at hub 1110 of approximately 0.05 to approximately 0.15, such as approximately 0.097. In some embodiments, blade 1120 can have a camber ratio of the maximum distance, $b_t$, of the camber line, $C_t$, to the chord line, $L_{C,t}$, at tip 1124 of approximately 0 to approximately 0.005.

In some embodiments, blades 1120 may be shaped such that liquid passing through runner 1100 in longitudinal direction 1150 contacts at least one blade 1120, as discussed above with respect to FIGS. 9A-F. In some embodiments, trailing edge 1128 may be shaped to approximate the shape of leading edge 1126.

FIGS. 12A-12G show a runner 1200 according to an embodiment. Runner 1200 can include some or all of the features, structures, or characteristics discussed above with respect to runner 900.

Runner 1200 can include a hub 1210 and a plurality of blades 1220 extending radially from hub 1210. Each blade 1220 of runner 1200 can include a root 1222 located at hub 1210, a tip 1224 opposite root 1222 and defining an outermost extent of blade 1220 in radial direction 1260, a leading edge 1226 at an upstream portion of runner 1200, a trailing edge 1228 at a downstream portion of runner 1200, a pressure surface 1230 on an upstream side of blade 1220, and a suction surface 1232 on a downstream side of blade 1220. Runner 1200 can be configured to rotate in a circumferential direction 1270 about longitudinal axis 1250. As shown, for example in FIG. 12C, circumferential direction 1270 is counterclockwise when viewed from an upstream side of runner 1200. However, in other embodiments, circumferential direction 1270 may be clockwise when viewed from an upstream side of runner 1200.

Blade 1220 has a thick, curved leading edge without a significant cantilever. The concave curvature of the leading edge (when viewed from upstream, as in FIG. 12C) enables the blade leading edge to encounter fish at a slanted angle θ as illustrated in FIG. 9C. This slanted angle reduces the force felt by fish, as compared to contact with a straight-edged blade that does not slant relative to the trajectory of the fish, and improves their chance of surviving a strike. The runner illustrated in FIG. 12 does not have a strongly cantilevered tip. As shown in FIG. 12C the tip of the runner blade does not pass forward of a radial line passing through point of connection between the blade root and the blade hub 1260. Thus, self-induced moment loads on the blade due to centripetal forces will be low in comparison to a blade with greater amount of cantilevered mass. As a consequence, this runner blade will be relatively easier to manufacture. The forward sweep, into the flow, of the blade at its intersection with both the hub and the outer circumference of the turbine promote the ability of the runner to pass foreign objects such as trash or fish without any chance of such materials becoming caught in a wedge or converging corner.

In some embodiments, runner 1200 can operate at a range of speed numbers, σ, ranging from approximately 0.5 to approximately 2, such as approximately 0.8. For example, if runner 200 has diameter $D_t$ of 2 meters and is operating under a net head of 7 meters, it may rotate at about 160 rpm.

Hub 1210 has a cylindrical configuration that tapers inward at one end. As shown, for example, in FIG. 12B, hub 1210 begins to taper within the span of blades 1220 (i.e., hub 1210 is tapered where blades 1220 meet hub 1210). However, in other embodiments, hub 1210 begins to taper downstream of blades 1220.

Runner 1200 includes three blades 1220. However, in other embodiments, runner 1200 may include two blades 1220 or may include more than three blades 1220. As discussed above, providing relatively few blades can result in decreased fish mortality and reduced rotor solidity (the ratio of the total area of the rotor blades to the swept area of the rotor) and thus blockage of flow through runner 1200. Blades 1220 may be evenly spaced about a circumference of hub 1210. In some embodiments, blades 1220 are arranged helically on hub 1210. In some embodiments, each of the plurality of blades 1220 of runner 1200 have the same shape and dimensions.

Blade 1220 may have leading edge thickness $T_{LE}$ and a length $L_{LE}$. The ratio of leading edge thickness $T_{LE}$ to runner diameter $D_R$ (i.e., $T_{LE}/D_R$) of runner 1200 is large relative to a conventional low-head runner design. $T_{LE}/D_t$ can be approximately 0.06 to approximately 0.35, such as approximately 0.08 to approximately 0.25, such as approximately 0.1 to approximately 0.14. As discussed, this $T_{LE}/D_R$ ratio results in decreased fish mortality relative to a conventional runner. As shown, for example, in FIGS. 12D-F, a cross section of blade 1220 of runner 1200 can be taken at hub 1210 (FIG. 12F), at meridian 1223 (FIG. 12E), or at tip 1224 (FIG. 12D). Each cross section can have a chord length $L_c$. Each cross section of blade 1220 can have a maximum thickness $t_{max}$. Each cross section of blade 1220 can have a camber line, C. Blade 1220 can have a chord length, $L_c$.

In some embodiments, a ratio of chord length at hub 1210 ($L_{C,h}$) to a diameter of runner 1200 ($D_t$) (i.e., $L_{C,h}/D_t$) can be approximately 0.55 to approximately 0.75, such as approximately 0.6 to approximately 0.64. In some embodiments, a ratio of chord length at tip 1224 ($L_{C,t}$) to a diameter of runner 1200 ($D_t$) (i.e., $L_{C,t}/D_t$) can be approximately 1.0 to approximately 1.7, such as approximately 1.4 to approximately 1.6.

In some embodiments, a ratio of chord length at hub 1210 ($L_{C,h}$) to leading edge length ($L_{LE}$) (i.e., $L_{C,h}/L_{LE}$) can be approximately 1.5 to approximately 1.8. In some embodiments, a ratio of chord length at tip 1224 ($L_{C,t}$) to leading edge length $L_{LE}$ (i.e., $L_c$, $t/L_{LE}$) can be approximately 2.5 to approximately 3.75.

In some embodiments, a ratio of chord length at hub 1210 ($L_{C,h}$) to circumferential spacing (CS) (i.e., $L_{C,h}$/CS) can be approximately 1.35 to approximately 1,55, such as approximately 1.48 to approximately 1.53. In some embodiments, a ratio of chord length at tip 1224 ($L_{C,t}$) to circumferential spacing (CS) (i.e., $L_{C,t}$/CS) can be approximately 0.9 to approximately 1.6, such as approximately 1.35 to approximately 1.5. In some embodiments, a ratio of maximum thickness at hub 1210 ($t_{max,h}$) to a diameter of runner 1200 ($D_t$) (i.e., $t_{max,h}/D_t$) can be approximately 0.25 to approximately 0.35, such as approximately 0.3 to approximately 0.33. In some embodiments, a ratio of maximum thickness at tip 1224 ($t_{max,t}$) to a diameter of runner 1200 ($D_t$) (i.e., $t_{max,t}/D_t$) can be approximately 0.1 to approximately 0.25, such as approximately 0.15 to approximately 0.17. A runner 1200 with ratios within the ranges noted above results in decreased fish mortality relative to a conventional runner.

In some embodiments, a ratio of maximum thickness at hub 1210 ($t_{max,h}$) to chord length ($L_{C,h}$) is approximately 0.25 to approximately 0.35, such as approximately 0.3 to approximately 0.33. In some embodiments, a ratio of maximum thickness at tip 1224 ($t_{max,t}$) to chord length ($L_{C,t}$) is approximately 0.1 to approximately 0.25 such as approximately 0.15 to approximately 0.17.

In some embodiments, blade 1220 can have a camber ratio of the maximum distance, $b_h$, of the camber line, $C_h$, to the chord line, $L_{C,h}$, at hub 1210 of approximately 0.05 to approximately 0.15, such as approximately 0.097. In some embodiments, blade 1220 can have a camber ratio of the maximum distance, $b_t$, of the camber line, $C_t$, to the chord line, $L_{C,t}$, at tip 1224 of approximately 0 to approximately 0.005.

Blade 1220 can have an arc-shaped leading edge 1226. In some embodiments, leading edge 1226 can have a semi-circular shape, a parabolic shape, a conic shape, or some other shape. In some embodiments, leading edge 1226 can be straight.

As shown, for example, in FIG. 12C, leading edge 1226 of blade 220 slants backward (i.e. opposite circumferential direction 1270) between root 1222 and intermediate location I, and slants forward (i.e. in circumferential direction 1270) between intermediate location I and tip 1224. The slant angle continuously decreases moving from root 1222 to intermediate location I. At location I, the slant angle is approximately 90 degrees. The slant angle continuously decreases moving from intermediate location I to tip 1224. The slant angle at tip 1224, $\theta_t$, is approximately 45 degrees. Intermediate location I is located approximately half way between root 1222 and tip 1224 (in radial direction 1260), such that leading edge 1226 slants backward over approximately the same radial distance as it slants forward.

As discussed, fish mortality is a function of the normal component $w_N$ of strike velocity, and the normal component $w_N$ of strike velocity is reduced for slant angles θ other than 90 degrees. Leading edge 1226 of blade 1220 has a slant angle other than 90 degrees except for at intermediate location I. Thus, fish mortality is reduced (relative to a straight blade).

As mentioned, the slant angle of leading edge 1226 of blade 1220 continuously decreases moving from intermediate location I, where the slant angle is approximately 90 degrees, to tip 1224. As a result, the normal component of strike velocity $w_N$ is decreased to a greater extent moving from intermediate location I to tip 1224, meaning mortality is decreased to a greater extent moving from intermediate location I to tip 1224. The blade tangential speed generally increases from root 1222 to tip 1224. Thus, the continuous decrease of slant angle from intermediate location I to tip 1224 reduces mortality to a greater extent where the tangential speed is relatively high.

As shown, for example, in FIG. 12C, leading edge 1226 at root 1222 is positioned beyond leading edge 1226 at tip 1224 (in circumferential direction 1270). As a result, leading edge 1226 of blade 1220 is not cantilevered. A non-cantilevered configuration, such as that shown in FIG. 12C, offers certain advantages over cantilevered designs. For example, a non-cantilevered blade may have sufficient structural stiffness without the need for additional reinforcement. As a result, a non-cantilevered blade can be easier and cheaper to manufacture than a cantilevered blade.

The ability to achieve a small slant angle near tip 1224 without creating a cantilever is due, in part, to the backward slant of leading edge 1226 between root 1222 and intermediate location I.

In some embodiments, blades 1220 may be shaped such that liquid passing through runner 1200 in longitudinal direction 1250 contacts at least one blade 1220, as discussed above with respect to FIGS. 9A-F. In some embodiments, trailing edge 1228 may be shaped to approximate the shape of leading edge 1226.

In some embodiments, runner 1200 is configured to rotate such that the effective strike velocity along leading edge 1226 is at most about 7 m/s. Slanted leading edge 1226, therefore, allows runner 1200 to rotate at a higher speed while maintaining safe fish passage. In turn, a higher rotation speed can improve the power specific speed and economic competitiveness of runner 1200.

FIGS. 13A-13G show a runner 1300 according to an embodiment. Runner 1300 can include some or all of the features, structures, or characteristics discussed above with respect to runner 900.

Runner 1300 can include a hub 1310 and a plurality of blades 1320 extending radially from hub 1310. Each blade 1320 of runner 1300 can include a root 1322 located at hub 1310, a tip 1324 opposite root 1322 and defining an outermost extent of blade 1320 in radial direction 1360, a leading edge 1326 at an upstream portion of runner 1300, a trailing edge 1328 at a downstream portion of runner 1300, a pressure surface 1330 on an upstream side of blade 1320, and a suction surface 1332 on a downstream side of blade 1320. Runner 1300 can be configured to rotate in a circumferential direction 1370 about longitudinal axis 1350. As shown, for example in FIG. 13C, circumferential direction 1370 is counterclockwise when viewed from an upstream side of runner 1300. However, in other embodiments, circumferential direction 1370 may be clockwise when viewed from an upstream side of runner 1300.

Blade 1320 has a thick, curved leading edge and significant cantilever. The significant cantilever enables an acute slant angle of the runner at the tip, improving survival of fish passing through this area. This runner achieves a consistently high solidity (ratio of blade chord length, to blade spacing) from root to tip of approximately 1.5, which allows high efficiency particularly at speed number between 0.6-0.9. A runner of this design can achieve efficiency exceeding 91-92%. This runner has a large amount of cantilevered mass, as illustrated in FIG. 13C; a significant amount of the runner's leading edge at the tip protrudes forward of the radial line 1360. At high runner rotation speeds, this mass will cause self-induced moment loads on the blade structure, creating additional design and manufacturing difficulty which adds cost in implementing the blade, and potentially limiting the achievable design head for this style of runner.

In some embodiments, runner 1300 can operate at a range of speed numbers, σ, ranging from approximately 0.5 to approximately 2, such as approximately 0.8, which equates to a head range of approximately 2.5 meters to approximately 20 meters. For example, if runner 200 has diameter $D_t$ of 2 meters and is operating under a net head of 7 meters, it may rotate at about 160 rpm.

Hub 1310 has a cylindrical configuration that tapers inward at one end. As shown, for example, in FIG. 13B, hub 1310 begins to taper within the span of blades 1320 (i.e., hub 1310 is tapered where blades 1320 meet hub 1310). However, in other embodiments, hub 1310 begins to taper downstream of blades 1320.

Runner 1300 includes three blades 1320. However, in other embodiments, runner 1300 may include two blades 1320 or may include more than three blades 1320. As discussed above, providing relatively few blades can result in decreased fish mortality and reduced rotor solidity (the ratio of the total area of the rotor blades to the swept area of the rotor) and thus blockage of flow through runner 1300. Blades 1320 may be evenly spaced about a circumference of hub 1310. In some embodiments, blades 1320 are arranged helically on hub 1310. In some embodiments, each of the plurality of blades 1320 of runner 1300 have the same shape and dimensions.

Blade 1230 may have leading edge thickness $T_{LE}$ and a length $L_{LE}$. The ratio of leading edge thickness $T_{LE}$ to runner diameter $D_R$ (i.e., $T_{LE}/D_R$) of runner 1300 is large relative to a conventional low-head runner design. $T_{LE}/D_t$ can be approximately 0.06 to approximately 0.35, such as approximately 0.08 to approximately 0.25, such as approximately 0.1 to approximately 0.14. As discussed, this $T_{LE}/D_R$ ratio results in decreased fish mortality relative to a conventional runner. As shown, for example, in FIGS. 13D-F, a cross section of blade 1320 of runner 1300 can be taken at hub 1310 (FIG. 13F), at meridian 1323 (FIG. 13E), or at tip 1324 (FIG. 13D). Each cross section can have a chord length $L_c$. Each cross section of blade 1320 can have a maximum thickness $t_{max}$. Each cross section of blade 1320 can have a camber line, C. Blade 1320 can have a chord length $L_c$.

In some embodiments, a ratio of chord length at hub 1310 ($L_{C,h}$) to a diameter of runner 1300 ($D_t$) (i.e., $L_{C,h}/D_t$) can be approximately 0.55 to approximately 0.75, such as approximately 0.6 to approximately 0.64. In some embodiments, a ratio of chord length at tip 1324 ($L_{C,t}$) to a diameter of runner 1300 ($D_t$) (i.e., $L_{C,t}/D_t$) can be approximately 1.0 to approximately 1.7, such as approximately 1.4 to approximately 1.6.

In some embodiments, a ratio of chord length at hub 1310 ($L_{C,h}$) to leading edge length ($L_{LE}$) (i.e., $L_{C,h}/L_{LE}$) can be approximately 1.5 to approximately 1.8. In some embodiments, a ratio of chord length at tip 1324 ($L_{C,t}$) to leading edge length $L_{LE}$ (i.e., $L_c$, $t/L_{LE}$) can be approximately 2.5 to approximately 3.75.

In some embodiments, a ratio of chord length at hub 1310 ($L_{C,h}$) to circumferential spacing (CS) (i.e., $L_{C,h}$/CS) can be approximately 1.35 to approximately 1,55, such as approximately 1.48 to approximately 1.53. In some embodiments, a ratio of chord length at tip 1324 ($L_{C,t}$) to circumferential spacing (CS) (i.e., $L_{C,t}$/CS) can be approximately 0.9 to approximately 1.6, such as approximately 1.35 to approximately 1.5.

In some embodiments, a ratio of maximum thickness at hub 1310 ($t_{max,h}$) to a diameter of runner 1300 ($D_t$) (i.e., $t_{max,h}/D_t$) can be approximately 0.25 to approximately 0.35, such as approximately 0.3 to approximately 0.33. In some embodiments, a ratio of maximum thickness at tip 1324 ($t_{max,t}$) to a diameter of runner 1300 ($D_t$) (i.e., $t_{max,t}/D_t$) can be approximately 0.1 to approximately 0.25, such as approximately 0.15 to approximately 0.17. A runner 1300 with ratios within the ranges noted above results in decreased fish mortality relative to a conventional runner.

In some embodiments, a ratio of maximum thickness at hub 1310 ($t_{max,h}$) to chord length ($L_{C,h}$) is approximately 0.25 to approximately 0.35, such as approximately 0.3 to approximately 0.33. In some embodiments, a ratio of maximum thickness at tip 1324 ($t_{max,t}$) to chord length ($L_{C,t}$) is approximately 0.1 to approximately 0.25 such as approximately 0.15 to approximately 0.17.

In some embodiments, blade 1320 can have a camber ratio of the maximum distance, $b_h$, of the camber line, $C_h$, to the chord line, $L_{C,h}$, at hub 1310 of approximately 0.05 to approximately 0.15, such as approximately 0.097. In some embodiments, blade 1320 can have a camber ratio of the maximum distance, $b_t$, of the camber line, $C_t$, to the chord line, $L_{C,t}$, at tip 1324 of approximately 0 to approximately 0.005.

Blade 1320 can have an arc-shaped leading edge 1326. In some embodiments, leading edge 1326 can have a semi-circular shape, a parabolic shape, a conic shape, or some other shape. In some embodiments, leading edge 1326 can be straight.

As shown, for example, in FIG. 13C, leading edge 1326 of blade 1320 slants backward between root 1322 and intermediate location I, and slants forward between intermediate location I and tip 1324. The slant angle continuously decreases moving from root 1322 to intermediate location I, where the slant angle is approximately 90 degrees. The slant angle continuously decreases moving from intermediate location I to tip 1324. The slant angle at tip 1324, $\theta_t$, is approximately 35 degrees. Intermediate location I is located less than half way between root 1322 and tip 1324 (in radial direction 1360), such that most of leading edge 1326 slants forward. In some embodiments, intermediate location I is located less than one quarter of the way between root 1322 and tip 1324 (in radial direction 1360). In some embodiments, intermediate location I is located less than one eighth of the way between root 1322 and tip 1324 (in radial direction 1360).

As discussed, fish mortality is a function of the normal component $w_N$ of strike velocity, and the normal component $w_N$ of strike velocity is reduced for slant angles θ other than 90 degrees. Leading edge 1326 of blade 1320 has a slant angle other than 90 degrees except at intermediate location I. Thus, fish mortality is reduced in these regions (relative to a straight blade).

As mentioned, the slant angle of leading edge 1326 of blade 1320 continuously decreases moving from intermediate location I, where the slant angle is approximately 90 degrees, to tip 1324. As a result, the normal component of strike velocity $w_N$ is decreased to a greater extent moving from intermediate location I to tip 1324, meaning mortality is decreased to a greater extent moving from intermediate location I to tip 1324. The blade tangential speed generally increases from root 1322 to tip 1324. Thus, the continuous decrease of slant angle from intermediate location I to tip 1324 reduces mortality to a greater extent where the tangential speed is relatively high.

As shown, for example, in FIG. 13C, leading edge 1326 at tip 1324 is positioned beyond leading edge 1326 at root 1322 (in circumferential direction 1370). As a result, leading edge 1326 of blade 1320 is cantilevered. As tip 1324 at leading edge 1326 extends further beyond leading edge 1326 at root 1322 (in circumferential direction 1370), smaller slant angles near tip 1324 can be achieved. As discussed, this can result in a reduced normal component of strike velocity $w_N$, thereby reducing mortality. However, as tip 1324 at leading edge 1326 extends further beyond leading edge 1326 at root 1322 (in circumferential direction 1370), a more extreme cantilever is created. This may, for example, result in increased manufacturing costs to produce minimum structural stiffness at tip 1324. Structural stiffness may be required, for example, to retain tip 1324 in the tight tolerances of a turbine housing.

In some embodiments, blades 1320 may be shaped such that liquid passing through runner 1300 in longitudinal direction 1350 contacts at least one blade 1320, as discussed above with respect to FIGS. 9A-F. In some embodiments, trailing edge 1328 may be shaped to approximate the shape of leading edge 1326.

In some embodiments, runner 1300 is configured to rotate such that the effective strike velocity along leading edge 1326 is at most about 7 m/s. Slanted leading edge 1326, therefore, allows runner 1300 to rotate at a higher speed while maintaining safe fish passage. In turn, a higher rotation speed can improve the power specific speed and economic competitiveness of runner 1300.

FIGS. 14A-14G show a runner 1400 according to an embodiment. Runner 1400 can include some or all of the features, structures, or characteristics discussed above with respect to runner 900.

Runner 1400 can include a hub 1410 and a plurality of blades 1420 extending radially from hub 1410. Each blade 1420 of runner 1400 can include a root 1422 located at hub 1410, a tip 1424 opposite root 1422 and defining an outermost extent of blade 1420 in radial direction 1460, a leading edge 1426 at an upstream portion of runner 1400, a trailing edge 1428 at a downstream portion of runner 1400, a pressure surface 1430 on an upstream side of blade 1420, and a suction surface 1432 on a downstream side of blade 1420. Runner 1400 can be configured to rotate in a circumferential direction 1470 about longitudinal axis 1450. As shown, for example in FIG. 14C, circumferential direction 1470 is counterclockwise when viewed from an upstream side of runner 1400. However, in other embodiments, circumferential direction 1470 may be clockwise when viewed from an upstream side of runner 1400.

Blade 1420 has a thick, curved leading edge and a minor cantilevered tip region. The profile of the leading edge as viewed from upstream (FIG. 14C) is designed so that this runner achieves both a steep slant angle at the intersection of the runner tip with the housing (for improved fish safety) while also limiting the amount of cantilevered mass, to minimize self-induced centripetal moments, and thus achieving reductions in manufacturing cost to meet certain radial deflection criteria. This type of design may allow the steeply slanted runner to operate at higher operating speeds than a runner with more significant cantilevered tip region. The other benefits of the curved leading edge are retained, as described for the runners in FIG. 12 and FIG. 13. This runner may also utilize a leading edge with different thickness from hub to tip. By increasing the runner tip cross section thickness, a functionally equivalent solidity to a runner such as in FIG. 13 can be achieved, despite the tip cross section having a technical solidity of only 1.1-1.3.

In some embodiments, runner 1400 can operate at a range of speed numbers, σ, ranging from approximately 0.5 to approximately 2, such as approximately 0.8, which equates to a head range of approximately 2.5 meters to approximately 20 meters. For example, if runner 200 has diameter $D_t$ of 2 meters and is operating under a net head of 7 meters, it may rotate at about 160 rpm.

Hub 1410 has a cylindrical configuration that tapers inward at one end. As shown, for example, in FIG. 14B, hub 1410 begins to taper within the span of blades 1420 (i.e., hub 1410 is tapered where blades 1420 meet hub 1410). However, in other embodiments, hub 1410 begins to taper downstream of blades 1420.

Runner 1400 includes three blades 1420. However, in other embodiments, runner 1400 may include two blades 1420 or may include more than three blades 1420. As discussed above, providing relatively few blades can result in decreased fish mortality and reduced rotor solidity (the ratio of the total area of the rotor blades to the swept area of the rotor) and thus blockage of flow through runner 1400. Blades 1420 may be evenly spaced about a circumference of hub 1410. In some embodiments, blades 1420 are arranged helically on hub 1410. In some embodiments, each of the plurality of blades 1420 of runner 1400 have the same shape and dimensions.

Blade 1420 may have leading edge thickness $T_{LE}$ and a length $L_{LE}$. The ratio of leading edge thickness $T_{LE}$ to runner diameter $D_R$ (i.e., $T_{LE}/D_R$) of runner 1400 is large relative to a conventional low-head runner design. $T_{LE}/D_t$ can be approximately 0.06 to approximately 0.35, such as approximately 0.08 to approximately 0.25, such as approximately 0.1 to approximately 0.14. As discussed, this $T_{LE}/D_R$ ratio results in decreased fish mortality relative to a conventional runner. As shown, for example, in FIGS. 14D-F, a cross section of blade 1420 of runner 1400 can be taken at hub 1410 (FIG. 14F), at meridian 1423 (FIG. 14E), or at tip 1424 (FIG. 14D). Each cross section can have a chord length $L_c$. Each cross section of blade 1420 can have a maximum thickness $t_{max}$. Each cross section of blade 1420 can have a camber line, C. Blade 1420 can have a chord length, $L_c$.

In some embodiments, a ratio of chord length at hub 1410 ($L_{C,h}$) to a diameter of runner 1400 ($D_t$) (i.e., $L_{C,h}/D_t$) can be approximately 0.55 to approximately 0.75, such as approximately 0.6 to approximately 0.64. In some embodiments, a ratio of chord length at tip 1424 ($L_{C,t}$) to a diameter of runner 1400 ($D_t$) (i.e., $L_{C,t}/D_t$) can be approximately 1.0 to approximately 1.7, such as approximately 1.4 to approximately 1.6.

In some embodiments, a ratio of chord length at hub 1410 ($L_{C,h}$) to leading edge length ($L_{LE}$) (i.e., $L_{C,h}/L_{LE}$) can be approximately 1.5 to approximately 1.8. In some embodiments, a ratio of chord length at tip 1424 ($L_{C,t}$) to leading edge length $L_{LE}$ (i.e., $L_c$, $t/L_{LE}$) can be approximately 2.5 to approximately 3.75.

In some embodiments, a ratio of chord length at hub 1410 ($L_{C,h}$) to circumferential spacing (CS) (i.e., $L_{C,h}$/CS) can be approximately 1.35 to approximately 1,55, such as approximately 1.48 to approximately 1.53. In some embodiments, a ratio of chord length at tip 1424 ($L_{C,t}$) to circumferential spacing (CS) (i.e., $L_{C,t}$/CS) can be approximately 0.9 to approximately 1.6, such as approximately 1.35 to approximately 1.5.

In some embodiments, a ratio of maximum thickness at hub 1410 ($t_{max,h}$) to a diameter of runner 1400 ($D_t$) (i.e., $t_{max,h}/D_t$) can be approximately 0.25 to approximately 0.35, such as approximately 0.3 to approximately 0.33. In some embodiments, a ratio of maximum thickness at tip 1424 ($t_{max,t}$) to a diameter of runner 1400 ($D_t$) (i.e., $t_{max,t}/D_t$) can be approximately 0.1 to approximately 0.25, such as approximately 0.15 to approximately 0.17. A runner 1400 with ratios within the ranges noted above results in decreased fish mortality relative to a conventional runner.

In some embodiments, a ratio of maximum thickness at hub 1410 ($t_{max,h}$) to chord length ($L_{C,h}$) is approximately 0.25 to approximately 0.35, such as approximately 0.3 to approximately 0.33. In some embodiments, a ratio of maximum thickness at tip 1424 ($t_{max,t}$) to chord length ($L_{C,t}$) is approximately 0.1 to approximately 0.25 such as approximately 0.15 to approximately 0.17.

In some embodiments, blade 1420 can have a camber ratio of the maximum distance, $b_h$, of the camber line, $C_h$, to the chord line, $L_{C,h}$, at hub 1410 of approximately 0.05 to approximately 0.15, such as approximately 0.097. In some embodiments, blade 1420 can have a camber ratio of the maximum distance, $b_t$, of the camber line, $C_t$, to the chord line, $L_{C,t}$, at tip 1424 of approximately 0 to approximately 0.005.

Blade 1420 can have an arc-shaped leading edge 1426. In some embodiments, leading edge 1426 can have a semi-circular shape, a parabolic shape, a conic shape, or some other shape. In some embodiments, leading edge 1426 can be straight.

As shown, for example, in FIG. 14C, leading edge 1426 of blade 1420 slants backward between root 1422 and intermediate location I, and slants forward between intermediate location I and tip 1424. The slant angle continuously decreases moving from root 1422 to intermediate location I, where the slant angle is approximately 90 degrees. The slant angle continuously decreases moving from intermediate location I to tip 1424. The slant angle at tip 1424, $\theta_t$, is approximately 30 degrees. Intermediate location I is located approximately half way between root 1422 and tip 1424 (in radial direction 1460), such that leading edge 1246 slants backward over approximately the same radial distance as it slants forward.

As discussed, fish mortality is a function of the normal component $w_N$ of strike velocity, and the normal component $w_N$ of strike velocity is reduced for slant angles θ other than 90 degrees. Leading edge 1426 of blade 1420 has a slant angle other than 90 degrees except at intermediate location I. Thus, fish mortality is reduced in these regions (relative to a straight blade).

As mentioned, the slant angle of leading edge 1426 of blade 1420 continuously decreases moving from intermediate location I, where the slant angle is approximately 90 degrees, to tip 1424. As a result, the normal component of strike velocity $w_N$ is decreased to a greater extent moving from intermediate location I to tip 1424, meaning mortality is decreased to a greater extent moving from intermediate location I to tip 1424. The blade tangential speed generally increases from root 1422 to tip 1424. Thus, the continuous decrease of slant angle from intermediate location I to tip 1424 reduces mortality to a greater extent where the blade tangential speed is relatively high.

As shown, for example, in FIG. 14C, leading edge 1426 at tip 1424 is positioned beyond leading edge 1426 at root 1422 (in circumferential direction 1470). As a result, leading edge 1426 of blade 1420 is cantilevered. As tip 1424 at leading edge 1426 extends further beyond leading edge 1426 at root 1422 (in circumferential direction 1470), smaller slant angles near tip 1424 can be achieved. As discussed, this can result in a reduced normal component of strike velocity $w_N$, thereby reducing mortality. However, as tip 1424 at leading edge 1426 extends further beyond leading edge 1426 at root 1422 (in circumferential direction 1470), a more extreme cantilever is created. This may, for example, result in increased manufacturing costs to produce minimum structural stiffness at tip 1424. The cantilever shown, for example, in FIG. 14C, however, is not sufficiently exaggerated to cause a significant increase in manufacturing costs.

In some embodiments, blades 1420 may be shaped such that liquid passing through runner 1400 in longitudinal direction 1450 contacts at least one blade 1420, as discussed above with respect to FIGS. 9A-F. In some embodiments, trailing edge 1428 may be shaped to approximate the shape of leading edge 1426.

In some embodiments, runner 1400 is configured to rotate such that the effective strike velocity along leading edge 1426 is at most about 7 m/s. Slanted leading edge 1426, therefore, allows runner 1400 to rotate at a higher speed while maintaining safe fish passage. In turn, a higher rotation speed can improve the power specific speed and economic competitiveness of runner 1400.

In some embodiments, runner 1000, 1100, 1200, 1300, or 1400 may have a compact size. This may enable, for example, easy transport of runner 1000, 1100, 1200, 1300, or 1400. For example, a diameter $D_t$ of runner 1000, 1100, 1200, 1300, or 1400 may be at least about 0.5 meter. In an aspect, a diameter $D_t$ of runner 1000, 1100, 1200, 1300, or 1400 may range from about 0.5 meter to about 5 meters, such as about 1 meter to about 3 meters. A length $L_r$ of runner 1000, 1100, 1200, 1300, or 1400 in longitudinal direction 1050, 1150, 1250, 1350, or 1450 may, for example, be about 1.7 meters to about 2.1 meters.

Runner 1000, 1100, 1200, 1300, or 1400 and/or blades 1020, 1120, 1220, 1320, or 1420 may be made of any suitable material and may be formed by any suitable process. In some embodiments, runner 1000, 1100, 1200, 1300, or 1400 and/or blades 1020, 1120, 1220, 1320, or 1420 are made of molded carbon/fiberglass and resin. In such embodiments, blades 1020, 1120, 1220, 1320, or 1420 may include a core composed of a lightweight foam. In some embodiments, runner 1000, 1100, 1200, 1300, or 1400 is composed of metal, such as bronze, stainless steel, or the like, and may be formed by castings that are machined to the final shape. In some embodiments, runner 1000, 1100, 1200, 1300, or 1400 is composed of composites and is produced via conventional methods of composite construction. For example, runner 1000, 1100, 1200, 1300, or 1400 may have a sandwich construction or may include a shear web inside a structure. In some embodiments, runner 200 is composed of an elastomer or polymer, with reinforcements either locally or distributed throughout its interior.

Blades 1020, 1120, 1220, 1320, or 1420 may have a hybrid construction. In some embodiments, leading edge 1026, 1126, 1226, 1326, or 1426 of blades 1020, 1120, 1220, 1320, or 1420 is armored. Leading edge 1026, 1126, 1226, 1326, or 1426 may have a coating applied. Leading edge may be metallic. In some embodiments, blade tips 1024, 1124, 1224, 1324, or 1424 are molded with a thick layer of ablative material such that blades tips 1024, 1124, 1224, 1324, or 1424 can wear into the inner diameter of a housing of a turbine (shown, e.g., in FIGS. 15A-C).

FIGS. 15A-15C illustrate a fish safe runner 1510 integrated into a pit turbine 1500, whose inlet 1512 is intended to be connected to the discharge of a pressurized pipe or penstock. Water flows axially around a pit 1520 containing power transmission equipment 1560, is directed diagonally through a stage of guide vanes 1532 (which may be fixed in pitch, or adjustable, as required by the application), axially through runner 1510, through a draft tube 1540 or diffuser, and out of turbine 1500. The outlet 1518 of draft tube 1540 either discharges directly into a tailwater or else connects to a pipe which itself may communicate the discharged water to a tailwater body, or wherever the pipe leads. This type of turbine may be installed at any angle relative to ground, such as horizontal, or sloped, or vertical. The generator 1552 or power takeoff equipment such as a gearbox or coupling 1554, are contained in a pit 1520 which is open to the air and may be optionally covered for protection. An advantage of this type of turbine is easy access to the power transmission components such as shaft seals, bearings, and power takeoff equipment. This type of turbine is applicable across a wide range of head, from only a few meters of head up to 10 meters or even 20 meters.

FIGS. 16A-16C illustrate a fish safe runner 1610 integrated into a pit turbine 1600, whose inlet 1612 is intended to communicate directly with an open flume or canal or otherwise the headwater above a drop in elevation between headwater and tailwater. Water flows axially around a pit 1620 containing power transmission equipment 1660, is directed diagonally through a stage of guide vanes 1632 (which may be fixed in pitch, or adjustable, as required by the application), axially through runner 1610, through a draft tube 1640 or diffuser, and out of turbine 1600. The generator 1652 or power takeoff equipment such as a gearbox or coupling 1654 are contained in a pit 1620. The advantages of this turbine type are simplicity of access to the power transmission components as described for FIG. 15. This type of turbine is applicable mainly at very low head, less than approximately 5 meters or 7 meters.

FIGS. 17A-17C illustrates a fish safe runner 1710 integrated into a bulb turbine 1700, whose inlet is intended to communicate directly with an open flume or canal or otherwise the headwater above a drop in elevation between headwater and tailwater. Water flows through this turbine in a manner similar to FIG. 15. Water flows axially around bulb 1780 containing power transmission equipment 1760, is directed diagonally through a stage of guide vanes 1632 (which may be fixed in pitch, or adjustable, as required by the application), axially through runner 1710, through a draft tube 1740 or diffuser, and out of turbine 1700. A generator 1752 is fully enclosed in bulb 1780, which is water-tight. Power and control cables and any required additional routing such as lubrication oils or gases are plumbed to the turbine from a remote location on land. The advantages of this turbine type are its ability to operate completely submerged. This is useful in applications such as at large rivers, where high seasonal flow rates may often lead to local flooding. This type of bulb configuration can also be implemented within a pipeline, just like FIG. 15.

FIGS. 18A-18C illustrate a fish safe runner 1810 integrated into a bulb turbine 1800, whose inlet is intended to communicate directly with an open flume or canal or otherwise the headwater above a drop in elevation between headwater and tailwater. Water flows radially into turbine 1800, passing through a stage of guide vanes 1832 which induce whirl to the flow prior to passing axially through runner 1810, and exiting axially through a draft tube 1840 or diffuser. An advantage of this type of turbine is in its ability to be installed with minimum capital cost, and when operated with a vertical turbine axis, this turbine benefits from very low fluctuating self-induced loads (e.g. from rotating blade mass), promoting long life. It is possible to install this type of turbine in any orientation, including vertical or horizontal. Turbine 1800 can include a generator 1852, which can be enclosed in a dry bulb, just like in FIG. 17.

FIGS. 19A-19C illustrate a fish safe runner 1910 integrated into a tubular turbine 1900, whose inlet is intended to connect to a pressurized pipe or penstock. A cascade of stationary turning vanes 1935 are positioned in the elbow of the intake pipe, if the elbow is near 90 degrees. This type of turbine can be built with inlet elbows of smaller angle, such as 45 degrees, and in such an instance, the turning vanes may not be required. Water flows from the penstock through the elbow, into guide vanes 1930, which may be oriented with predominantly axial flow, or with flow having some component of diagonal direction similar to the pit or bulb intakes, inducing appropriate whirl to the flow. Water then flows through runner 1910, and exits axially into a diffuser or draft tube 1940, and from there, into an outlet tailwater or to an outlet pipe. This type of turbine can be installed at a range of angles from vertical to off-vertical. The turbine is well-suited to sites with head in excess of several meters, up to 20 meters, and allows for reductions in the length, width, and depth of civil works for the hydropower plant. Turbine 1900 can include a generator 1952.

Other turbines can be built in like manner. For example, a pressurized spiral case or scrollcase could supply water to the turbine of FIG. 18, allowing its application in a dry powerhouse rather than in an open flume forebay.

As shown, for example, in FIGS. 20A-B, the runner may be incorporated into a turbine, and the turbine may be part of hydroelectric installation 2000. Each turbine of hydroelectric installation 2000 may be an axial-flow turbine that has a longitudinal axis Z arranged in a vertical orientation such that flow of liquid through the turbine proceeds vertically downward in a direction of longitudinal axis Z of each turbine. In some embodiments, the turbine may include radial inflow as shown, and in some embodiments, the turbine may include axial inflow. Each turbine can be configured to operate when fully submerged. Further, each turbine may be modular so that additional turbines can be added, removed, or replaced in the hydroelectric installation 2000 as necessary.

Hydroelectric installation 2000 may be particularly suited for use in streams and rivers, which generally have a large trash load and contain debris, such as branches, leaves, vegetation, and trash, and the like. Hydroelectric installation 2000 is configured for use in low head applications, inhibits flow of rocks and debris into the turbines, and is configured such that its trash screen is largely self-cleaning.

Hydroelectric installation 2000 may include a plurality of turbine chambers 2010 as shown in FIGS. 20A-B. Turbine chambers 2010 may be arranged adjacent to one another in a direction transverse to a flow of headwater toward tailwater. Each turbine chamber 2010 may be defined by a pair of spaced parallel sidewalls and a floor. Turbine chamber 2010 may further include a downstream wall to maintain the head. Turbine chamber 2010 may be formed from pre-fabricated concrete panels to facilitate installation of hydroelectric installation 2000. Turbines can be arranged within turbine chamber 2010 and each turbine can be arranged in a vertical orientation.

Each turbine may be seated in a floor of turbine chamber 2010. Each turbine may include an interlocking key to prevent rotation of the turbine when seated in the floor. Each turbine can be supported by the force of gravity and by the flow of liquid. Thus, no supports or framework is required to install each turbine. As a result, each turbine may be easily installed simply by placing the turbine on the floor to seat the turbine in the floor of the turbine chamber 2010, and similarly each turbine may be easily removed without disassembly of a frame or other support structures.

One or more turbines may be arranged in each turbine chamber 2010. In FIG. 20A, for example, three turbines are arranged in each turbine chamber 2010, and a first turbine can be arranged upstream of a second turbine. However, in alternate embodiments, each turbine chamber 2010 may include additional turbines. As each of the turbine chambers 2010 may include multiple turbines, hydroelectric installation 2000 may have a grid-like arrangement of turbines.

An inlet of each turbine can be arranged above the floor of the turbine chamber 2010. In this way, the turbine can be arranged to prevent or inhibit rocks and other large debris from entering the turbine.

The turbine chambers can be protected by a trash rack 2020 with horizontal or very acute orientation with respect to the horizontal plane. An amount of water may be allowed to overflow the turbine chamber, carrying debris off the trash racks by means of the velocity of bypassing water. In this manner, costly trash rack cleaning devices can be avoided. In some cases, a trash rack cleaning system may be required and self-cleaning nature of the turbine-chambers will reduce the frequency of time required for the cleaning system to operate, compared to a turbine chamber with a vertically oriented trash rack.

Hydroelectric installation 2000 may further include an upstream gate at an inlet of turbine chamber 2010 to control a flow of liquid into turbine chamber 2010. The upstream gate can be movable between an open configuration for allowing flow of water into the turbine chamber and a closed configuration in which a flow of water is prevented from entering the turbine chamber.

FIG. 21. shows a process for designing a fish-safe runner. As one of skill in the art will understand, not all operations described are necessary and the operations need not be performed in the order described, unless otherwise apparent.

In operation 2110, a probability of a fish strike at a section of a runner blade is estimated. The section can, for example, be a cross section of the blade taken along the circumferential direction, or a portion of the blade between two concentric circles centered at a longitudinal axis of the runner. The probability of a fish strike can, for example, be estimated according to the von Raben equation discussed above. The probability of fish strike can also be estimated by other means, such as by using particle tracking in a computational fluid dynamics simulation.

In operation 2120, a probability of strike survival at the section is estimated. The estimation of strike survival at the section can, for example, be based, in whole or in part, on a fish length, a leading edge thickness of the blade at the section, a ratio of the leading edge thickness of the blade at the section to a diameter of the runner, a ratio of the maximum thickness of the blade at the section to the diameter of the runner, a ratio of the maximum thickness of the blade at the section to a length of a chord of the blade, a ratio of a chord length of the blade at the section to a circumferential spacing of the blade, a shape of a cross section of the leading edge of the blade at the section, a camber of a cross section of the blade at the section, a ratio of a chord length of the blade at the section to a length of the leading edge, a speed number, a slant angle of the leading edge of the blade at the section, or some other property of the blade. As discussed above, these properties can affect survival of a fish following a strike. The probability of fish strike can also be estimated by other means, such as by using particle tracking in a computational fluid dynamics simulation.

In operation 2130, a passage rate at the section is computed. The passage rate may be computed, for example, by multiplying the probability of a fish strike at the section estimated in operation 2110 and the probability of strike survival at the section estimated in operation 2120.

In operation 2140, one of more of the following is adjusted: a maximum leading edge thickness of the blade at the section, a ratio of the maximum leading edge thickness of the blade at the section to a diameter of the runner, a ratio of the maximum thickness of the blade at the section to the diameter of the runner, a ratio of the maximum thickness of the blade at the section to a length of a chord of the blade, a ratio of a chord length of the blade at the section to a circumferential spacing of the blade, a shape of a cross section of the leading edge of the blade at the section, a camber of a cross section of the blade at the section, a ratio of a chord length of the blade at the section to a length of the leading edge, a speed number, a slant angle of the leading edge of the blade at the section, some other property of the blade, or a number of blades. As discussed above, these properties can affect survival of a fish following a strike.

In operation 2150, operations 2110 through 2140 are repeated for a second section of the blade different than the first section.

In an aspect, after operation 2140, an operation can be performed to determine the feasibility of the runner design. For example, structural criteria and/or manufacturing cost criteria can be evaluated and balanced against the computed passage rate. If one or both of the structural criteria and manufacturing cost criteria are undesirable, operation 2140 can be repeated.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

The breadth and scope of the present invention(s) should not be limited by any of the above-described exemplary embodiments, but should be defined only in accordance with the following claims and their equivalents.

What is claimed is:

1. A runner for a hydraulic turbine configured to promote fish safety, the runner comprising:
- a hub; and
- a plurality of blades extending from the hub, wherein each of the plurality of blades comprises a root connected to the hub, a tip opposite the root, and a leading edge opposite a trailing edge,
- wherein a thickness of the leading edge of a blade of the plurality of blades varies along the leading edge between the tip and the root, wherein the thickness of the leading edge of the blade is greater at the tip than at the root.

2. The runner of claim 1, wherein the thickness of the leading edge of the blade decreases from the tip toward the root.

3. The runner of claim 1, wherein a ratio of a maximum thickness of the leading edge of the blade to a diameter of the runner is in a range of 0.06 to 0.35.

4. The runner of claim 1, wherein the thickness of the leading edge of the blade is at least 100 mm.

5. The runner of claim 1, wherein the leading edge of the blade is curved relative to a radial axis of the runner.

6. The runner of claim 1, wherein the root of the leading edge of the blade is arranged on a radial axis of the runner, and wherein the tip of the leading edge extends beyond the radial axis of the runner.

7. The runner of claim 1, wherein a ratio of the thickness of the blade at the tip to a chord length of the blade is in a range of 0.1 to 0.25.

8. A hydraulic turbine configured to promote fish safety, the hydraulic turbine comprising:
- a housing;
- a runner arranged in the housing, the runner comprising:
  - a hub; and
  - a plurality of blades extending from the hub, wherein each of the plurality of blades comprises a root connected to the hub, a tip opposite the root, and a leading edge opposite a trailing edge,
  - wherein a thickness of the leading edge of a blade of the plurality of blades varies along the leading edge between the tip and the root.

9. The hydraulic turbine of claim 8, further comprising a generator operably coupled to the runner.

10. The hydraulic turbine of claim 8, further comprising a draft tube connected to the housing and configured to discharge water from the hydraulic turbine.

11. The hydraulic turbine of claim 8, wherein the thickness of the leading edge of the blade decreases from the tip toward the root.

12. The hydraulic turbine of claim 8, wherein the thickness of the leading edge of the blade is greater at the tip than at the root.

13. The hydraulic turbine of claim 8, wherein a ratio of a maximum thickness of the leading edge of the blade to a diameter of the runner is in a range of 0.06 to 0.35.

14. The hydraulic turbine of claim 8, wherein the thickness of the leading edge of the blade is at least 100 mm.

15. The hydraulic turbine of claim 8, wherein the leading edge of the blade is curved relative to a radial axis of the runner.

16. The hydraulic turbine of claim 8, wherein the root of the leading edge of the blade is arranged on a radial axis of the runner, and wherein the tip of the leading edge extends beyond the radial axis of the runner.

17. The hydraulic turbine of claim 8, wherein a ratio of the thickness of the blade at the tip to a chord length of the blade is in a range of 0.1 to 0.25.

18. A runner for a hydraulic turbine configured to promote fish safety, the runner comprising:

a hub; and a plurality of blades extending from the hub, wherein each of the plurality of blades comprises a root connected to the hub, a tip opposite the root, and a leading edge opposite a trailing edge, wherein a thickness of the leading edge of a blade of the plurality of blades decreases from the tip toward the root of the blade, and wherein a ratio of a maximum thickness of the leading edge of the blade to a diameter of the runner is in a range of 0.06 to 0.35.

19. The runner of claim 18, wherein the root of the leading edge of the blade is arranged on a radial axis of the runner, and wherein the tip of the leading edge extends beyond the radial axis of the runner.

* * * * *